(12) United States Patent
Di Monte

(10) Patent No.: US 11,993,925 B2
(45) Date of Patent: May 28, 2024

(54) DUAL AIR ADMITTANCE VALVE

(71) Applicant: Michael Anthony Di Monte, Howell, NJ (US)

(72) Inventor: Michael Anthony Di Monte, Howell, NJ (US)

( * ) Notice: Subject to any disclaimer, the term of this patent is extended or adjusted under 35 U.S.C. 154(b) by 0 days.

(21) Appl. No.: 18/138,089

(22) Filed: Apr. 23, 2023

(65) Prior Publication Data

US 2023/0257977 A1   Aug. 17, 2023

Related U.S. Application Data

(63) Continuation of application No. 17/140,055, filed on Jan. 2, 2021, now Pat. No. 11,668,081, which is a continuation of application No. 16/286,217, filed on Feb. 26, 2019, now Pat. No. 10,914,057, which is a continuation of application No. 15/374,099, filed on Dec. 9, 2016, now Pat. No. 10,253,485, which is a continuation-in-part of application No. 15/299,446, filed on Oct. 20, 2016, now abandoned, which is a continuation-in-part of application No. 15/293,315, filed on Oct. 14, 2016, now Pat. No. 9,657,468, which is a continuation-in-part of application No. 15/275,419, filed on Sep. 25, 2016, now Pat. No. (Continued)

(51) Int. Cl.
| | |
|---|---|
| *E03C 1/122* | (2006.01) |
| *F16K 15/02* | (2006.01) |
| *F16K 15/04* | (2006.01) |
| *F16K 24/06* | (2006.01) |
| *F16K 27/02* | (2006.01) |
| *F16K 47/00* | (2006.01) |
| *G01L 7/16* | (2006.01) |
| *G01M 3/28* | (2006.01) |

(52) U.S. Cl.
CPC .......... *E03C 1/1225* (2013.01); *F16K 15/023* (2013.01); *F16K 15/042* (2013.01); *F16K 15/048* (2013.01); *F16K 24/06* (2013.01); *F16K 27/0209* (2013.01); *F16K 47/012* (2021.08); *G01L 7/166* (2013.01); *G01M 3/2876* (2013.01); *Y10T 137/87917* (2015.04)

(58) Field of Classification Search
CPC ........ F16K 47/00; F16K 47/01; F16K 47/011; F16K 47/012; F16K 47/02
See application file for complete search history.

(56) References Cited

U.S. PATENT DOCUMENTS

| | | | | |
|---|---|---|---|---|
| 1,724,878 | A | * | 8/1929 | Jensen .................... F16K 17/36 220/745 |
| 2,394,911 | A | * | 2/1946 | Griswold ................ E03C 1/108 137/859 |

(Continued)

*Primary Examiner* — Daphne M Barry
*Assistant Examiner* — Frederick D Soski

(57) ABSTRACT

Embodiments of air admittance valve assembly and plumbing system incorporating the same are provided herein. In some embodiments, a valve assembly comprising a housing, a first valve comprising a first valve sealing member and a first valve seat, and a second valve comprising a second valve sealing member and a second valve seat, and a pipe, an inlet, an outlet, a first zone, a second zone, a third zone, the first and second valve sealing member is closed by gravity and open based upon the pressure differential between the first zone, second zone and third zone.

3 Claims, 37 Drawing Sheets

Related U.S. Application Data 10,030,372, which is a continuation-in-part of application No. 15/246,464, filed on Aug. 24, 2016, now Pat. No. 9,926,691, which is a continuation-in-part of application No. 15/132,131, filed on Apr. 18, 2016, now Pat. No. 9,797,120.

(60) Provisional application No. 62/151,463, filed on Apr. 23, 2015.

(56) References Cited

U.S. PATENT DOCUMENTS

| | | | | |
|---|---|---|---|---|
| 3,513,875 | A * | 5/1970 | Nelson | F16K 7/00 137/533.19 |
| 3,620,240 | A * | 11/1971 | Bogdanski | F16K 17/18 137/202 |
| 4,139,469 | A * | 2/1979 | Rainin | B01D 15/166 210/136 |
| 4,248,270 | A * | 2/1981 | Ostrowski | F16K 47/00 239/533.13 |
| 4,325,398 | A * | 4/1982 | Green | F16K 17/366 137/39 |
| 4,387,736 | A * | 6/1983 | Major | F04B 11/0033 137/533.15 |
| 4,457,325 | A * | 7/1984 | Green | F16K 17/196 137/39 |
| 4,640,304 | A * | 2/1987 | Looney | F16K 24/046 137/614.21 |
| 4,739,898 | A * | 4/1988 | Brown | F16K 17/366 220/203.21 |
| 4,846,218 | A * | 7/1989 | Upchurch | G01N 30/32 137/550 |
| 4,862,907 | A * | 9/1989 | Ledtje | F16K 15/042 251/368 |
| 4,945,945 | A * | 8/1990 | Schmid | F16K 15/042 137/533.15 |
| 5,042,519 | A * | 8/1991 | Kerlin | B60K 15/03519 137/202 |
| 5,082,240 | A * | 1/1992 | Richmond | F16K 31/404 138/45 |
| 5,273,068 | A * | 12/1993 | Duren | F16K 24/06 137/526 |
| 5,474,541 | A * | 12/1995 | Ritsky | B65D 47/2075 137/533.15 |
| 5,480,054 | A * | 1/1996 | Midden | A47J 41/0005 220/203.02 |
| 5,487,528 | A * | 1/1996 | Richmond | G05D 7/0635 138/45 |
| 5,813,652 | A * | 9/1998 | Richmond | F16K 47/00 138/45 |
| 5,971,014 | A * | 10/1999 | Duren | E03C 1/12 137/526 |
| 6,234,198 | B1 * | 5/2001 | Chalich | F16K 24/06 137/526 |
| 7,140,388 | B2 * | 11/2006 | Chalich | F16K 15/042 137/526 |
| 7,270,146 | B1 * | 9/2007 | Johnston | E03C 1/122 137/526 |
| 7,331,360 | B2 * | 2/2008 | Camis, Jr. | F16K 27/0209 137/512.3 |
| 7,484,526 | B2 * | 2/2009 | Zelson | F16K 15/144 137/859 |
| 7,762,273 | B2 * | 7/2010 | Bottura | F16K 24/042 137/197 |
| 8,403,241 | B2 * | 3/2013 | Jung | B05B 7/2462 239/525 |
| 8,689,994 | B2 * | 4/2014 | Pashcow | B65D 90/34 116/109 |
| 10,253,485 | B2 * | 4/2019 | Di Monte, Sr. | E03C 1/1225 |
| 2003/0062086 | A1 * | 4/2003 | Chalich | F16K 24/06 137/526 |
| 2005/0145281 | A1 * | 7/2005 | Chalich | F16K 15/042 137/526 |
| 2006/0060243 | A1 * | 3/2006 | Yang | E03B 7/10 137/218 |
| 2006/0169329 | A1 * | 8/2006 | Camis | F16K 15/144 137/512 |
| 2006/0191576 | A1 * | 8/2006 | McCoy | F16K 24/06 137/526 |
| 2006/0237678 | A1 * | 10/2006 | Lackey | F16K 24/06 251/215 |
| 2008/0011373 | A1 * | 1/2008 | Zelson | F16K 15/144 137/859 |
| 2008/0314460 | A1 * | 12/2008 | McCoy | E03C 1/12 137/528 |
| 2009/0320936 | A1 * | 12/2009 | Brunner | F16K 17/194 137/533.11 |
| 2011/0147016 | A1 * | 6/2011 | Blease | A62C 35/68 137/517 |
| 2015/0198343 | A1 * | 7/2015 | Huber | E03F 5/042 454/358 |
| 2015/0308090 | A1 * | 10/2015 | Cole | F16K 17/12 137/526 |

* cited by examiner

DUAL AIR ADMITTANCE VALVE

CROSS-REFERENCE RELATED TO RELATED APPLICATIONS

The current application is a continuation application claiming the benefit and priority of a co-pending U.S. Nonprovisional patent application Ser. No. 17/140,055 filed Jan. 2, 2021. U.S. Nonprovisional patent application Ser. No. 17/140,055 is a continuation application claiming the benefit and priority of U.S. Nonprovisional patent application Ser. No. 16/286,217 filed Feb. 26, 2019, patented, U.S. patent Ser. No. 10/914,057. U.S. Nonprovisional patent application Ser. No. 16/286,217 is a continuation application claiming the benefit and priority of U.S. Nonprovisional patent application Ser. No. 15/374,099 filed Dec. 9, 2016, patented, U.S. patent Ser. No. 10/253,485. U.S. Nonprovisional patent application Ser. No. 15/374,099 is a continuation-in-part application claiming the benefit and priority of U.S. Nonprovisional patent application Ser. No. 15/299,446, filed Oct. 20, 2016, abandoned. U.S. Nonprovisional patent application Ser. No. 16/299,446 is a continuation-in-part application claiming the benefit and priority of U.S. Nonprovisional patent application Ser. No. 15/293,315, filed Oct. 14, 2016, patented, U.S. Pat. No. 9,657,468. U.S. Nonprovisional patent application Ser. No. 15/293,315 is a continuation-in-part application claiming the benefit and priority of U.S. Nonprovisional patent application Ser. No. 15/275,419, filed Sep. 25, 2016, patented, U.S. patent Ser. No. 10/030,372. U.S. Nonprovisional patent application Ser. No. 15/275,419 is a continuation-in-part application claiming the benefit and priority of U.S. Nonprovisional patent application Ser. No. 15/246,464, filed Aug. 24, 2016, patented, U.S. Pat. No. 9,926,691. U.S. Nonprovisional patent application Ser. No. 15/246,464 is a continuation-in-part application claiming the benefit and priority of U.S. Nonprovisional patent application Ser. No. 15/132,131, filed Apr. 18, 2016, patented, U.S. Pat. No. 9,797,120. U.S. Nonprovisional patent application Ser. No. 15/132,131 claims the priority and benefit of U.S. Provisional Application No. 62/151,463, filed Apr. 23, 2015, all of the above-listed prior applications are incorporated by reference entirely herein.

FIELD OF THE INVENTION

This invention generally relates to valves and more specifically, to valve assemblies for use in enclosed systems through which a medium flows or is stored.

BACKGROUND

A variety of air admittance valves and check valves have been developed for allowing air to enter a piping system or an enclosed environment under a negative or vacuum pressure, which is created when water flows down the drain, to prevent siphoning of traps or when a sump pump pumps water and air out of an enclosed sump pit. Attaching an air admittance valve or check valve allows ambient air to enter the enclosed environment to eliminate the negative pressure or vacuum in the enclosed system. Many of these valves are specifically designed for systems such as piping systems and sewer systems where it is difficult or impossible to install a local vent or air intake due to the difficulty of running pipes through an existing building. Typically, these air admittance or check valves only provide specific operating conditions such as, for example, the vacuum pressure in the amount of air required. Conventional air admittance and check valves available do not provide for instantaneous and higher volume of air demand, which is undesirable when existing air admittance components are installed on systems requiring the higher airflow demand because the higher airflow demand causes strain on the air admittance component and causes it to fail prematurely since the air admittance component was designed to function based on a natural gravity air flow vacuum or negative pressure constraint. Additionally, conventional air admittance components do not filter the air and therefore can allow for corrosive elements to pass through to the enclosed system, thus damaging the air admittance components and, potentially, the entire system.

In addition, an undesirable scenario is encountered when a negative pressure is generated in the piping system when flow is drained from the piping system. When such a negative pressure occurs, the water seals in the U-band or trap of the piping system will be syphoned out and can, therefore, no longer prevent sewer gas from entering the building. To address this issue, conventional air admittance and check valves have been designed to allow air to enter the piping system to prevent the negative pressure scenario. However, as explained above, conventional air admittance and check valves fail easily.

As such, there is currently no product available for a higher volume demand in a negative pressure scenario such as an enclosed pit with a pump requiring air to enter the system at the same rate at which water is pumped out. For example, a pump that pumps out 20 gallons of water per minute and would require a large demand of airflow to enter the system so that a vacuum is not formed in the enclosed environment resulting in stress on the pump and causing improper water discharge. In the case of a sump pump, the pump becomes air-locked and runs continuously, which causes the pump to overheat, burn out and/or fail resulting in flooding of the area and water damage to the building.

In many cases, a proper seal is required to provide a water and airtight seal after air has been allowed to enter the system and the pump disengages. Furthermore, if such an air admittance component does fail, the failure should occur in a closed/sealed position of the component to provide continued protection so that no fluid or gas can escape into the surrounding environment within the building or within a given height above the building's roof.

Although some check valves include a ball inside the valve to block or allow air flow through the valve, these conventional ball valves tend to fouled, which prevents the ball from achieving a perfect seal and blocking the air flow properly. A further drawback of conventional ball valves is the little to no rotation of the ball, resulting in wear of the ball from sealing at the same location.

A further drawback with conventional check valves is the lack of a failsafe in case a valve failure occurs. In other words, when conventional check valves fail, they cease to operate for their intended purpose. As such, two check valves are often installed in series, which is undesirable because this practice involves additional branch-offs and additional labor.

Therefore, the inventor has developed an improved valve assembly for use with an enclosed volume that needs to be vented.

SUMMARY OF THE INVENTION

Embodiments of a valve assembly and a plumbing system incorporating the same are provided herein. In some embodiments, a valve assembly for use with an enclosed environment, comprising: a housing having an interior volume, an inlet disposed at a first end of the housing and fluidly coupled to an environment surrounding the housing, and an outlet disposed at a second end of the housing opposite the first end and fluidly coupled to the enclosed environment; a first valve having a first valve seat and a first sealing member at least partially extending through a first opening in the first valve seat in a closed position, wherein the first sealing member is moveable between an open position which allows air to pass through the first opening and a closed position in which the first sealing member blocks air from moving through the first opening; a second valve disposed beneath the first valve and having a second valve seat and a second sealing member at least partially extending through a second opening in the second valve seat in a closed position, wherein the second sealing member is moveable between an open position which allows air to pass through the second opening and a closed position in which the second sealing member blocks air from moving through the second opening; a first filter element disposed at or proximate to the inlet and having a first plurality of openings configured to prevent any object having a size larger than any one of the first plurality of openings from passing through the first filter element into the interior volume; and a second filter element disposed at or proximate to the inlet and having a second plurality of openings configured to prevent any object having a size larger than any one of the second plurality of openings from passing through the second filter element into the interior volume, wherein the first valve seat is disposed in an upper portion of the interior volume and the second valve seat is disposed in a lower portion of the interior volume, and wherein the first and second valve seats divide the interior volume into a first zone, a second zone, and a third zone.

In some embodiments, a valve assembly for use with an enclosed environment a housing having an interior volume and an inlet disposed at a first end of the housing and fluidly coupled to an environment surrounding the housing, wherein the interior volume is defined by a wall and a ceiling of the housing, wherein the ceiling is disposed at a second end of the housing opposite the first end; a pipe extending into the interior volume and having an end disposed below the ceiling of the housing, wherein the end of the pipe has an inlet opening fluidly coupled to the enclosed environment; a first valve having a first valve seat and a first sealing member disposed above the first valve seat, wherein the first valve seat includes a first seat outer ring coupled to the wall of the housing and a first seat inner ring coupled to an exterior wall of the pipe, wherein the first sealing member includes a first central opening through which the pipe extends, and wherein the first sealing member is moveable between an open position in which air is allowed to pass through a first space between the first seat outer and inner rings and a closed position in which air is prevented from moving through the first space; a second valve disposed beneath the first valve and having a second valve seat and a second sealing member disposed above the second valve seat, wherein the second valve seat includes a second seat outer ring coupled to the wall of the housing and a second seat inner ring coupled to the exterior wall of the pipe, wherein the second sealing member includes a second central opening through which the pipe extends, and wherein the second sealing member is moveable between an open position in which air is allowed to pass through a second space between the second seat outer and inner rings and a closed position in which air is prevented from moving through the second space; an annular filter element disposed at or proximate to the inlet and configured to prevent contaminants from passing through the annular filter element into the interior volume; and a second filter element disposed within the pipe at or proximate to the inlet opening and configured to prevent contaminants from passing through the second filter element into the pipe, wherein at least one of the first valve or second valve includes a flexible membrane section disposed in the first or second sealing member and a ring disposed atop the flexible membrane section, wherein the ring has a predetermined weight and is configured to bias the first or second sealing member towards the closed position, wherein the first valve seat is disposed in an upper portion of the interior volume and the second valve seat is disposed in a lower portion of the interior volume, and wherein the first and second valve seats divide the interior volume into a first zone, a second zone, and a third zone.

BRIEF DESCRIPTION OF THE DRAWINGS

It should be noted that the drawings are merely representative, are not necessarily drawn to scale, and are not intended to limit the scope of the present invention.

DETAILED DESCRIPTION

Embodiments of a valve assembly for use with an enclosed environment and systems incorporating the same are disclosed herein. In some embodiments, the valve assembly may include a first valve and a second valve configured to be coupled to an enclosed environment, in which a negative pressure (i.e., a vacuum) is undesirable, to allow ambient air into the enclosed environment, thus advantageously increasing the negative pressure in the enclosed environment. For example, in some embodiments, the valve assembly may be coupled to a pipeline that is coupled to the trap of a drainage system. When a negative pressure exists in the pipeline downstream of the trap, the seal provided by water in the trap against sewage gas (e.g., methane), is broken, thus allowing the sewage gas to flow up through the drain pipe and into the house. The two valves of the inventive valve assembly advantageously provide a failsafe measure against valve failure. In other words, when one of the two valves fails (i.e., does not properly seal), the other valve still functions to prevent the a backflow of gases from the enclosed environment. A further advantage of the inventive valve assembly is that failure occurs in the closed position because the valves are biased towards a closed position by gravity. As such, even if valve failure occurs, the amount of backflow is significantly less than a fully open valve. Yet another advantage of the inventive valve assembly is its ability to avoid fouling by ensuring that the valve sealing member rotates.

Figure 1:
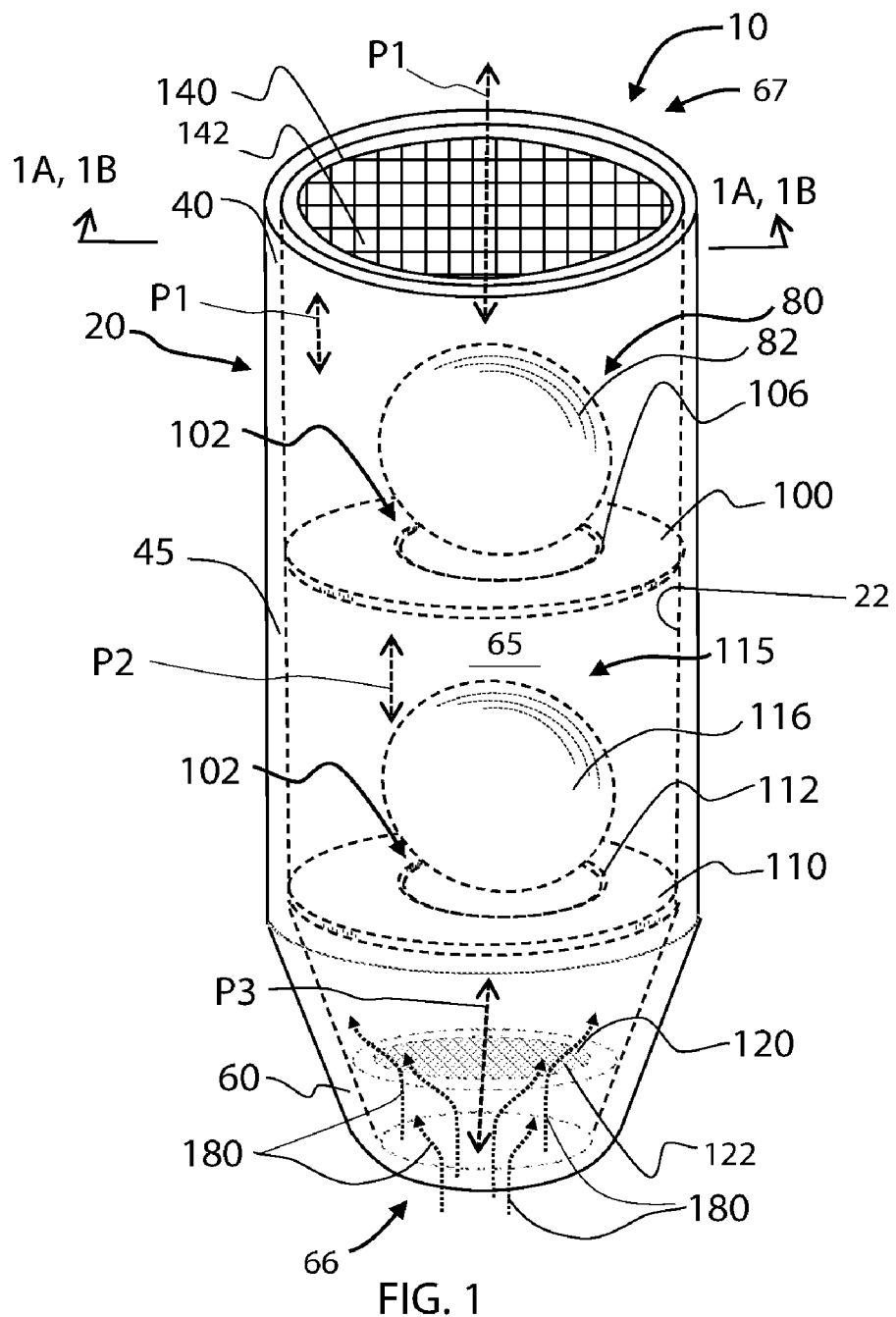
FIG. 1 is a perspective view of a valve assembly in accordance with some embodiments of the present invention.
Figure 1A:
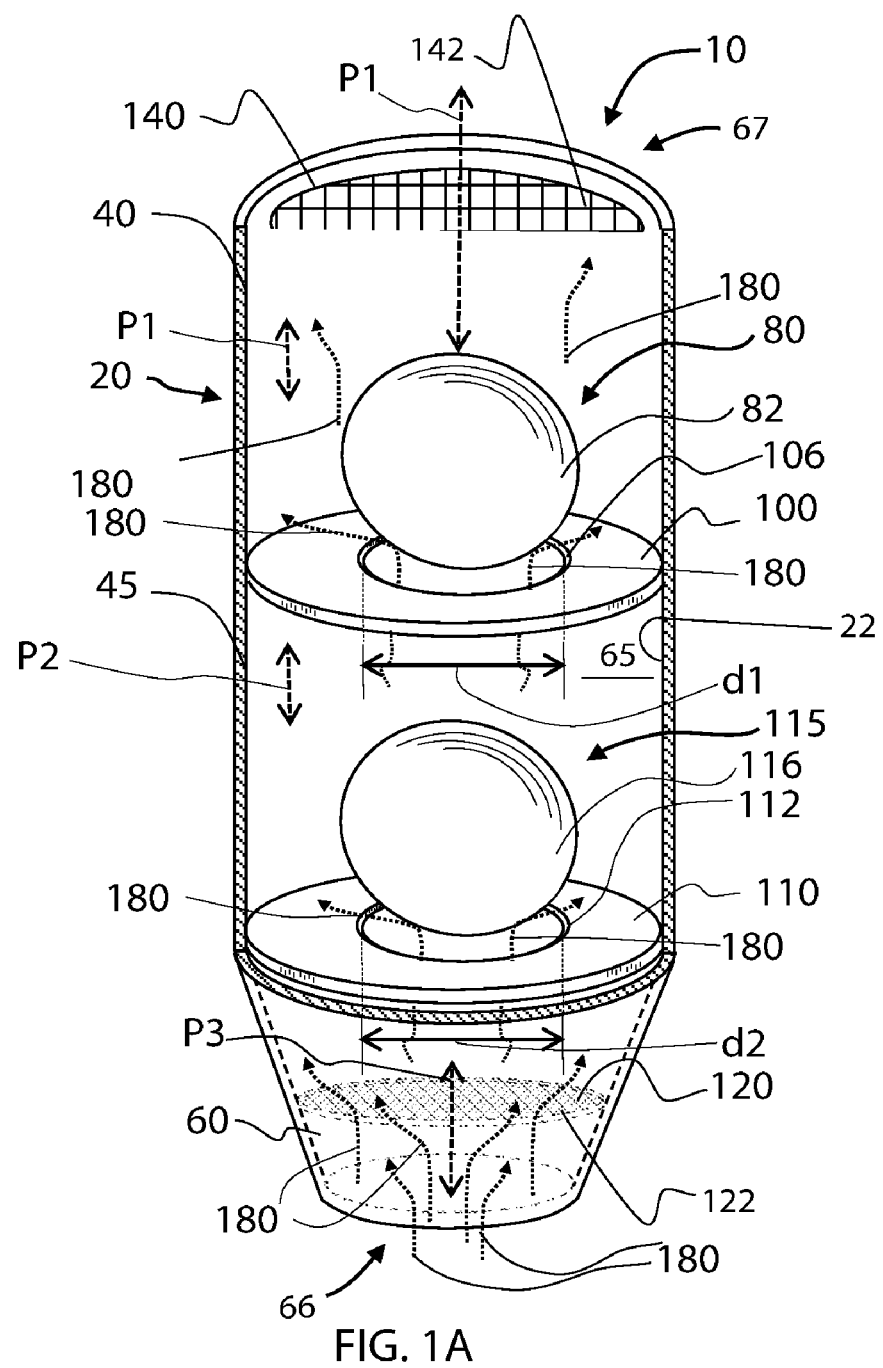
FIG. 1A is a cutaway view of a valve assembly in accordance with some embodiments of the present invention.
Figure 1B:
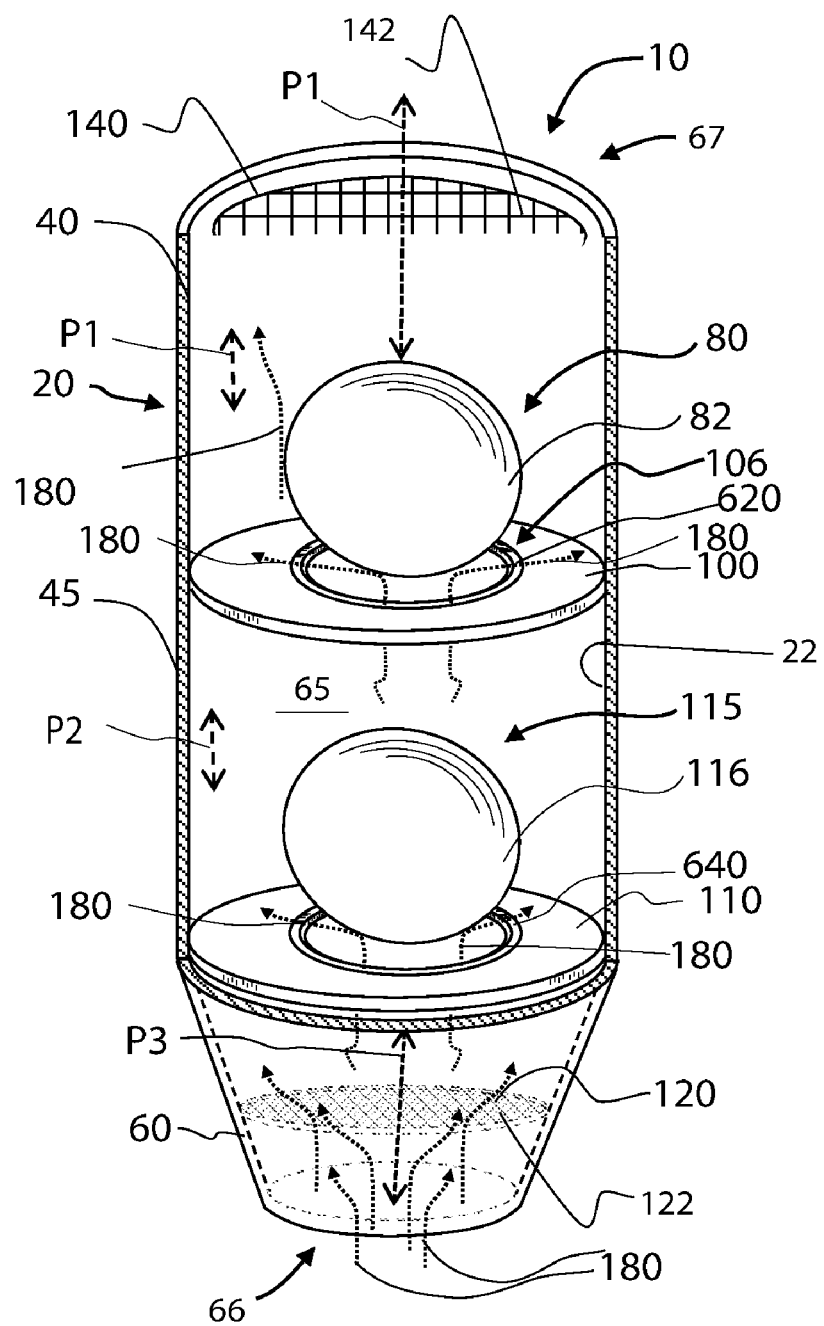
FIG. 1B is a cutaway view of a valve assembly in accordance with some embodiments of the present invention.

FIGS. 1, 1A, and 1B depict perspective and cutaway views of a valve assembly 10 in accordance with some embodiments of the present invention. In some embodiments, the valve assembly 10 includes a housing 20 having an interior volume 65, an inlet 66 disposed at a first end of the housing 20, and an outlet 67 disposed at a second end of the housing 20 opposite the first end. The inlet 66 is fluidly coupled to the environment surrounding the housing 20 to allow ambient air to enter into the interior volume 65. The outlet 67 is fluidly coupled to an enclosed environment (e.g., a pump pit, a pipeline, etc.), in which a negative pressure (i.e., a vacuum) may exist. The housing 20 is formed of any material that does not corrode or rust from exposure to water. For example, the housing 20 may be formed of plastic, copper, brass, cast iron, steel, or other commonly used materials in the field plumbing.

In some embodiments, the valve assembly 10 may include a first valve 80, having a first valve seat 100 and a first sealing member (e.g., first spherical body 82), and a second valve 115 disposed beneath the first valve 80 and having a second valve seat 110 and a second sealing member (e.g., second spherical body 116). The first and second spherical bodies 82, 116 mate with first and second openings 106, 112 in the first and second valve seats 100, 110, respectively, to selectively provide a seal against the corresponding valve seats. In some embodiments, at least one of the first and second spherical bodies 82, 116 is formed of a solid material having an exterior pliable layer to improve sealing capability of the spherical body. In some embodiments, at least one of the first and second spherical bodies 82, 116 may alternatively be hollow and filled with an inert gas such as, for example, argon, so that the size of spherical body does not change with changes in the ambient temperature. The constant size of the spherical body ensures that the valve will provide a sufficient seal consistently.

The first valve seat 100 is coupled to an inner wall 22 of the housing 20 in an upper portion of the interior volume 65. The second valve seat 110 is coupled to the inner wall 22 in a lower portion of the interior volume 65. Together, the first and second valve seats 100, 110 divide the interior volume into a first zone 40 disposed between the first valve seat 100 and the outlet 67, a second zone 45 disposed between the first and second valve seats 100, 110, and a third zone 60 disposed between the second valve seat 110 and the inlet 66.

The first and second spherical bodies 82, 116 are moveable between an open position (shown in FIGS. 1-1B), in which air is allowed to pass from the inlet 66, through the first, second, and third zones 40, 45, 60, and through the outlet 67, and a closed position, in which air does not pass through the zones and out of the outlet 67. The movement of each sealing member between the open and closed positions occurs when the pressure beneath the sealing member is greater than the combination of the pressure above the sealing member and the weight of the sealing member. For example, the first spherical body 82 is moved up to an open position when total downward forces exerted on the first spherical body 82 by the weight of the first spherical body 82 and a first pressure P1 in the first zone 40 are less than an upward force exerted on the first spherical body 82 by a second pressure P2 in the second zone 45. Likewise, the second spherical body 116 is moved up to an open position when the total downward forces exerted on the second spherical body 116 by the weight of the second spherical body 116 and the second pressure P2 are less than an upward force exerted on the second spherical body 116 by a third pressure P3 in the third zone 60. In this manner, the respective weights of the first and second spherical bodies 82, 116 are chosen so that the valve assembly 10 functions at predetermined pressure differentials. In some embodiments, each of the first and second spherical bodies 82, 116 may weigh between about 0.01 oz to about 1 lb 1 oz, depending on the application of the invention in different enclosed environment or piping systems operating at different pressures inside the enclosed environment or piping system.

When a negative pressure is present in the enclosed environment, to which the outlet 67 is fluidly coupled, the first pressure P1 becomes less than the second pressure P2, which is originally at or near atmospheric pressure but becomes less than the third pressure P3 (i.e., atmospheric pressure) after the first valve 80 is opened. As such, the flow 180 of ambient air through the valve assembly 10 is facilitated by the pressure differential between the enclosed environment at the outlet 67 and the surrounding environment at the inlet 66. Each sealing member has predetermined weight selected so that when a predetermined pressure differential at each valve is reached, the valve opens to allow air flow 180 through the opening in the valve seat.

In some embodiments, the valve assembly 10 may further include a first filter element 120 disposed at or proximate to the inlet 66. The first filter element includes a plurality of first openings 122 formed through the first filter element 120 and configured to prevent any foreign object/contaminant having a size larger than any one of the plurality of first openings from passing through the first filter element 120 into the interior volume 65, thus interfering with the seal between the sealing member and the valve seat. Similarly, a second filter element 140 may be disposed at or proximate to the outlet 67 and have a plurality of second openings 142.

In some embodiments, at least one of the first and second valve seats 100, 110 may include a compliant section 620/640, respectively, formed of a compliant/flexible material and directly adjacent to and surrounding the opening (i.e., corresponding one of the first and second openings 106, 112, respectively) to further improve the seal between the first and/or second spherical bodies 82/116 and their corresponding valve seats. In some embodiments, the compliant section 620/640 is a thin-walled section surrounding the first and second openings 106, 112. In some embodiments, the entire valve seat may be formed of the compliant material. In some embodiments, the valve seat may alternatively include an outer rigid section formed of a rigid material surrounding the compliant section. The rigid section may be formed of rigid materials such as, for example, plastic (e.g., PVC), a dense rubber with a high shore hardness (e.g., above about 80 A), a non-corrosive metal, or the like. When the compliant section 620/640 has a radial width greater than or equal to that of the rigid section (first valve 80 in FIGS. 2-2C) the compliant section may act as a diaphragm to advantageously alleviate a positive pressure in an adjacent zone in excess of a threshold pressure (e.g., a pressure at which the water seal in a trap is disturbed or destroyed) by expanding, thus temporarily increasing the volume of the adjacent zone. The compliant material can be any material that does not corrode with exposure to water and that has a Shore Hardness between about 20 A and about 50 A. For example, the compliant material may be rubber, EPDM (Ethylene Propylene Diene Monomer), silicon, and combination thereof.

Figure 2:
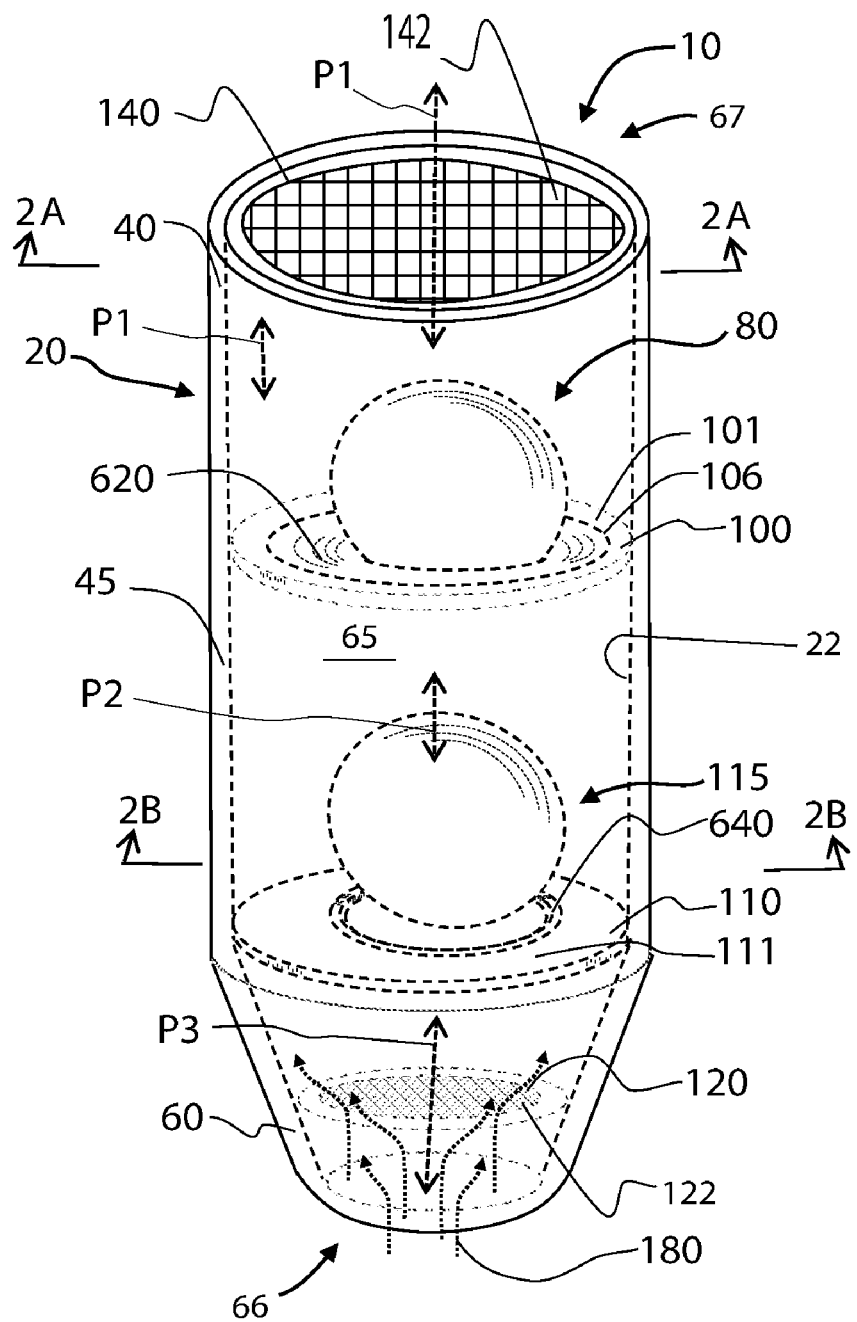
FIG. 2 is a perspective view of a valve assembly in accordance with some embodiments of the present invention.
Figure 2A:
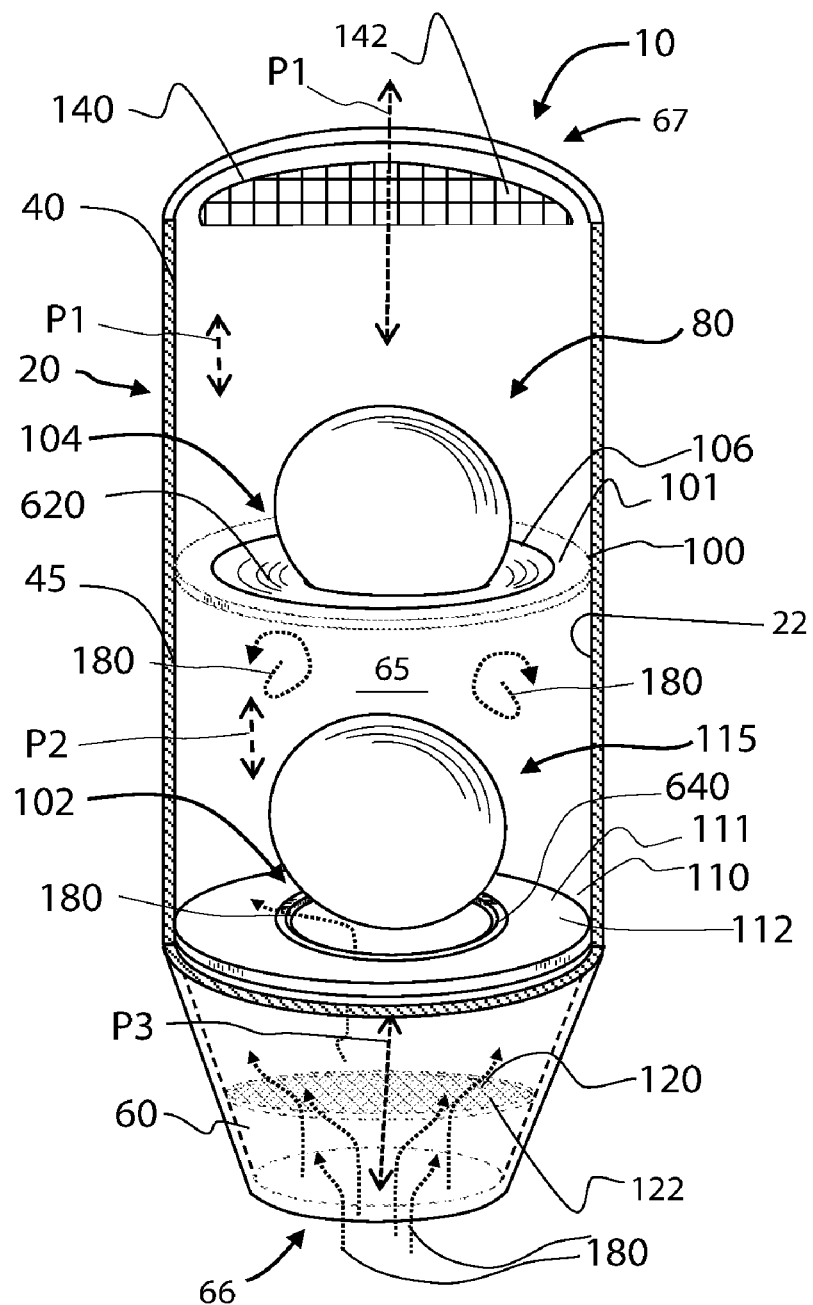
FIG. 2A is a cutaway view of a valve assembly in accordance with some embodiments of the present invention.
Figure 2B:
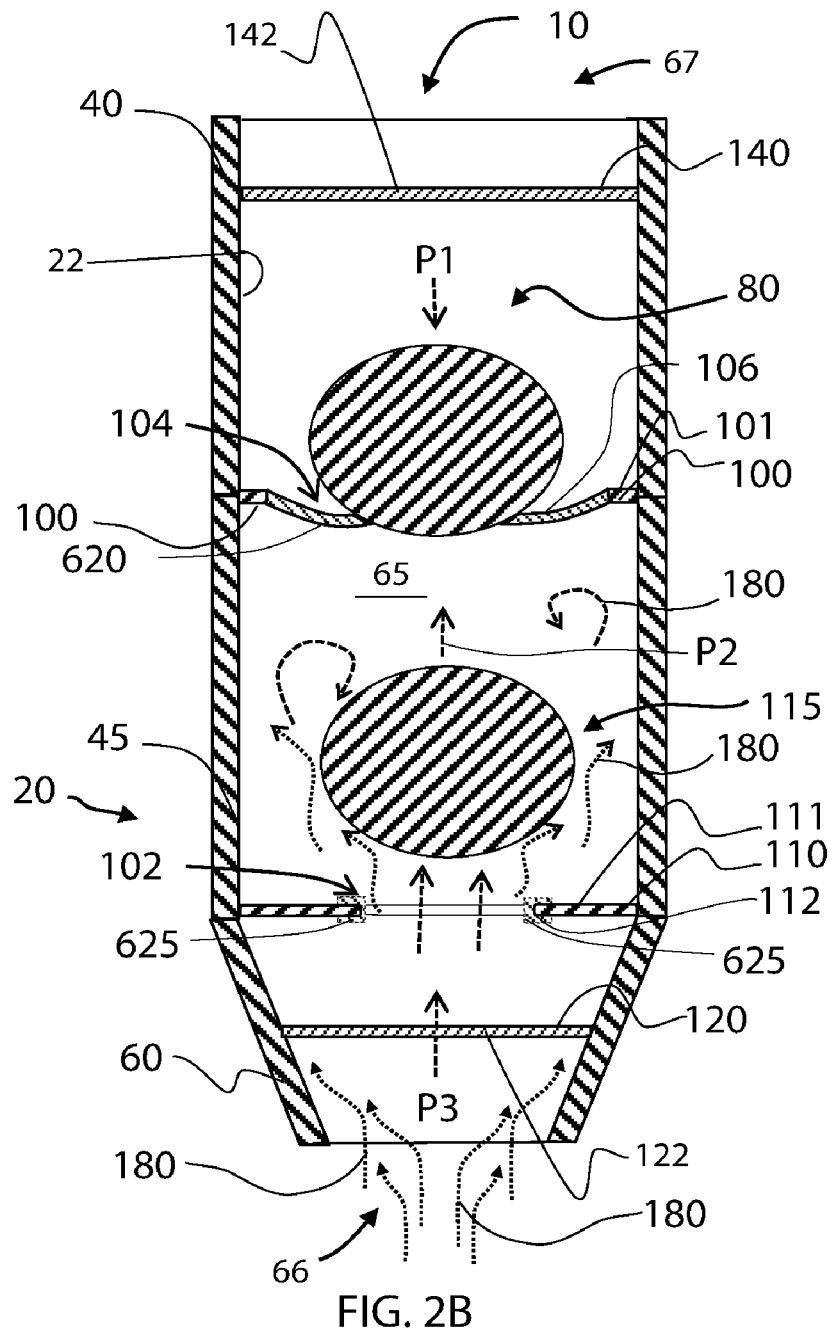
FIG. 2B is a cross-sectional view of a valve assembly in accordance with some embodiments of the present invention.
Figure 2C:
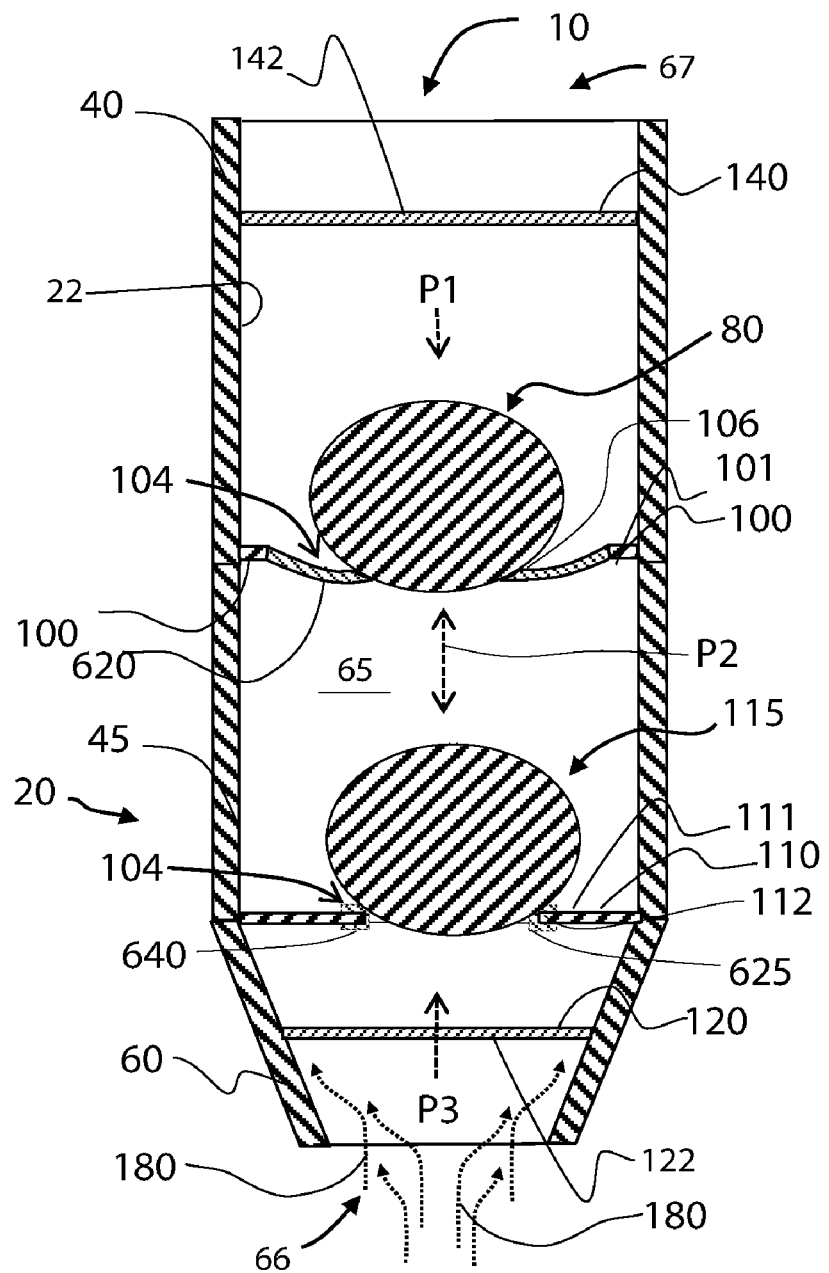
FIG. 2C is a cross-sectional view of a valve assembly in accordance with some embodiments of the present invention.
Figure 3:
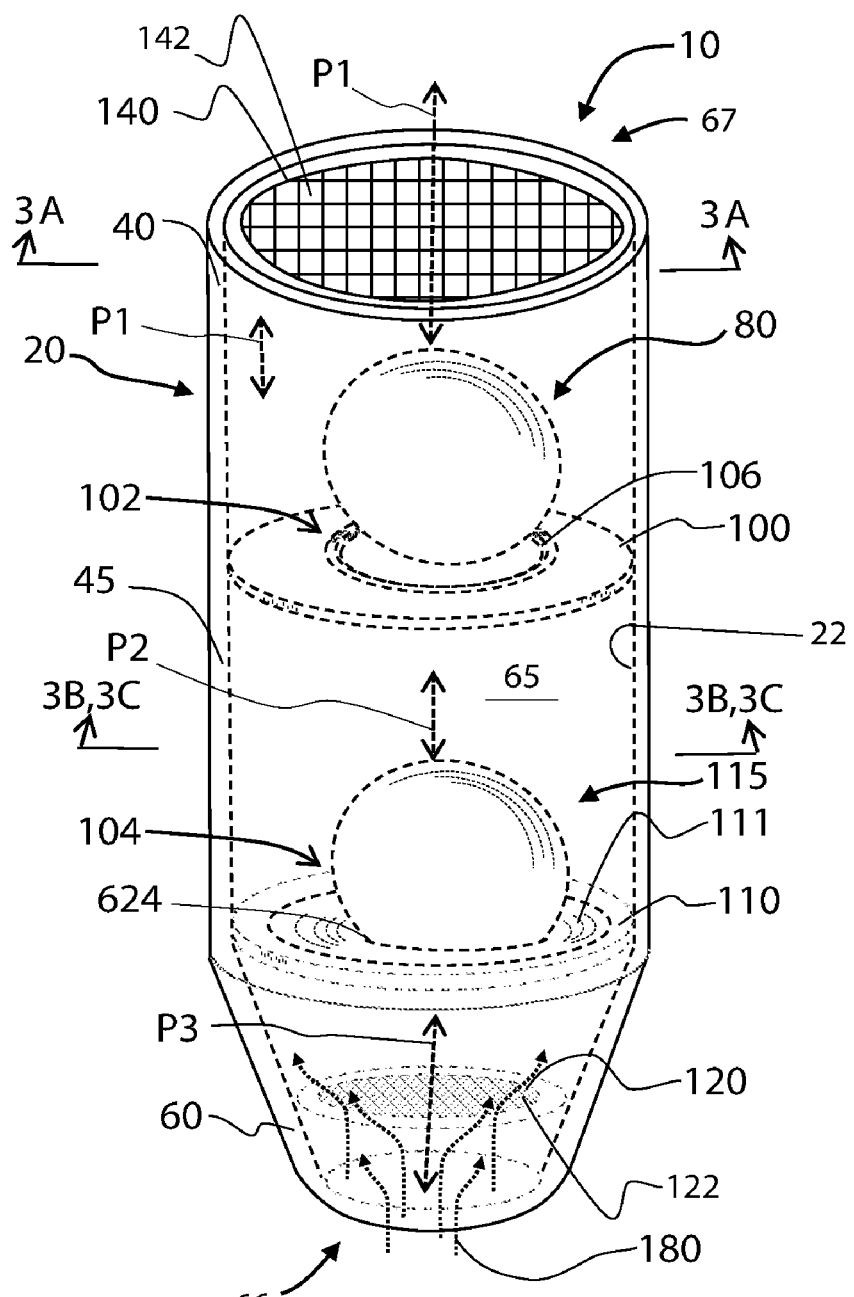
FIG. 3 is a perspective view of a valve assembly in accordance with some embodiments of the present invention.
Figure 3A:
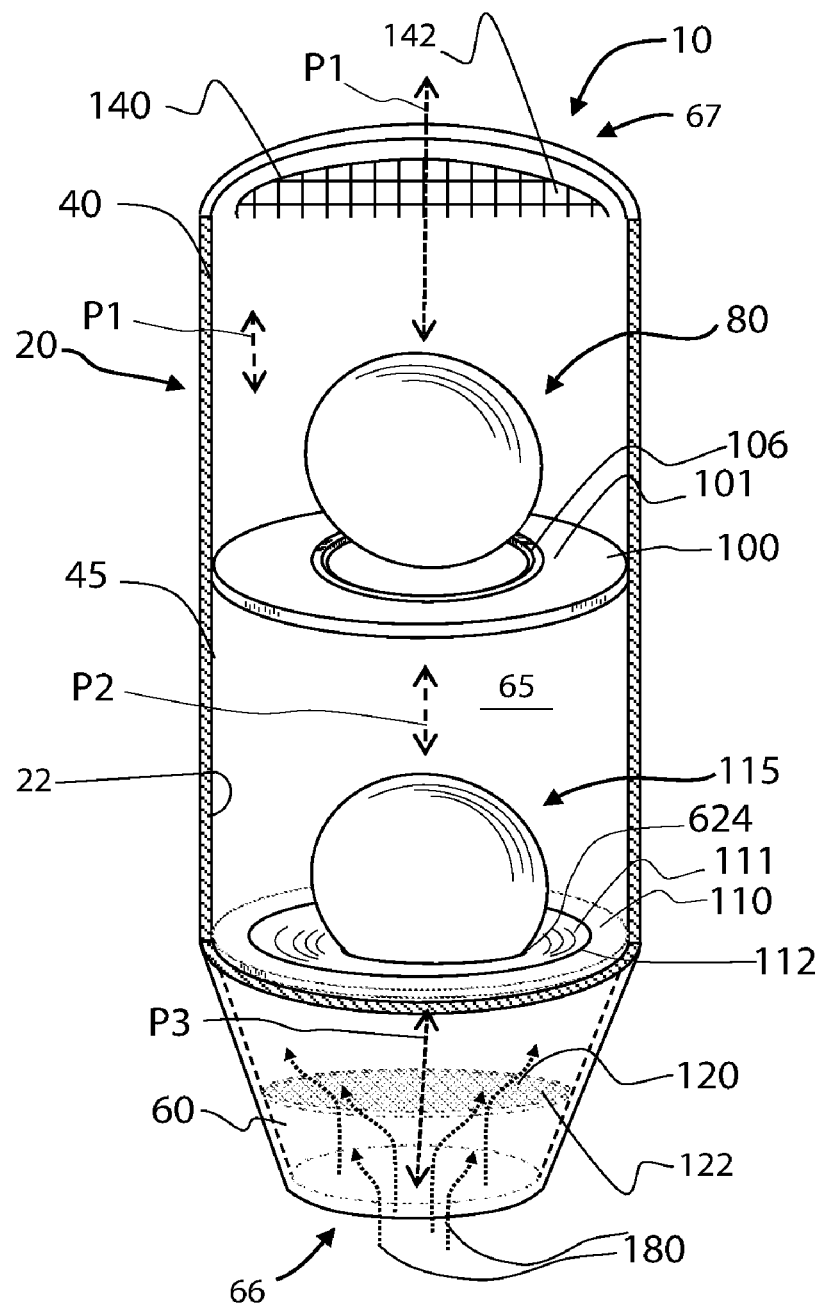
FIG. 3A is a cutaway view of a valve assembly in accordance with some embodiments of the present invention.
Figure 3B:
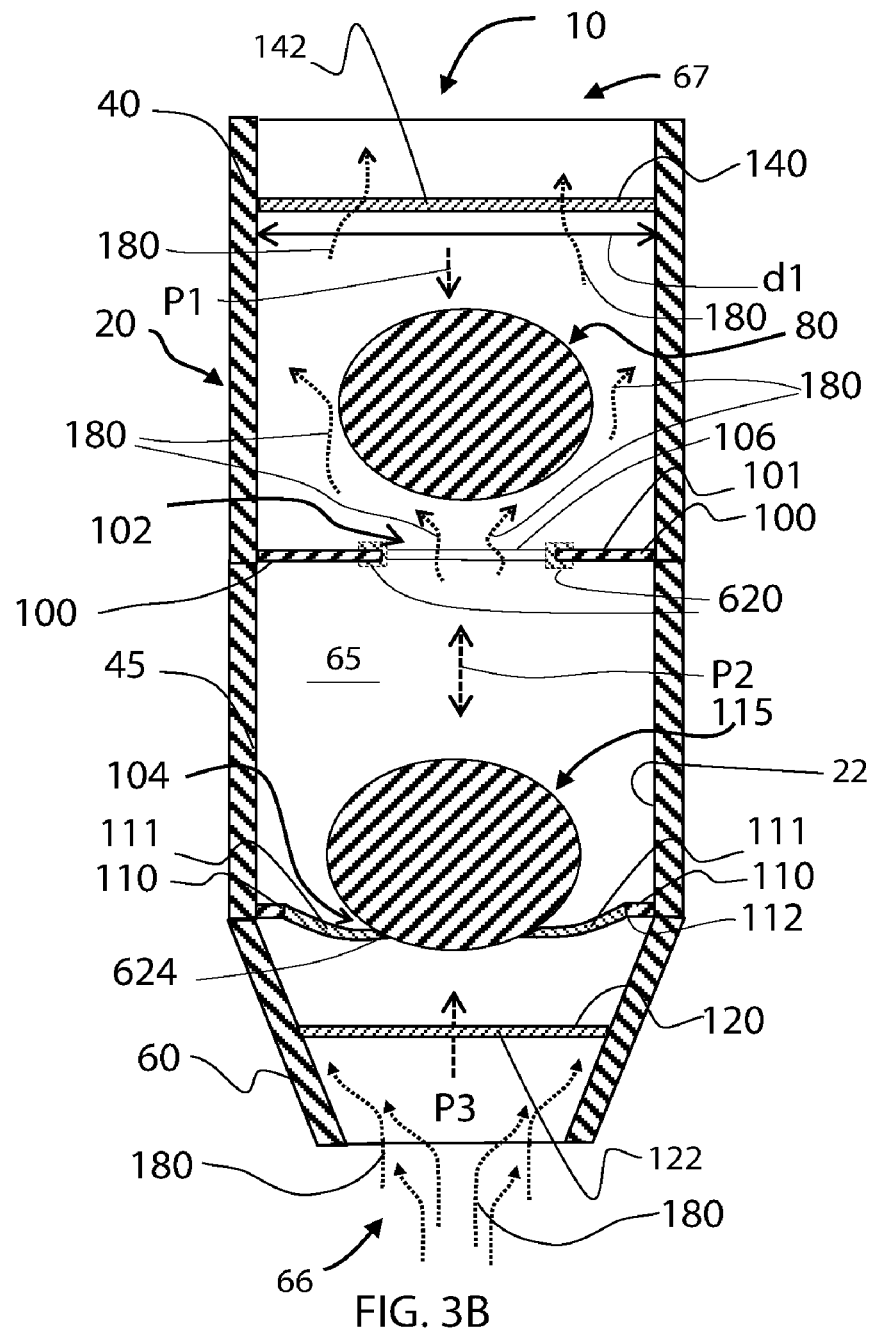
FIG. 3B is a cross-sectional view of a valve assembly in accordance with some embodiments of the present invention.
Figure 3C:
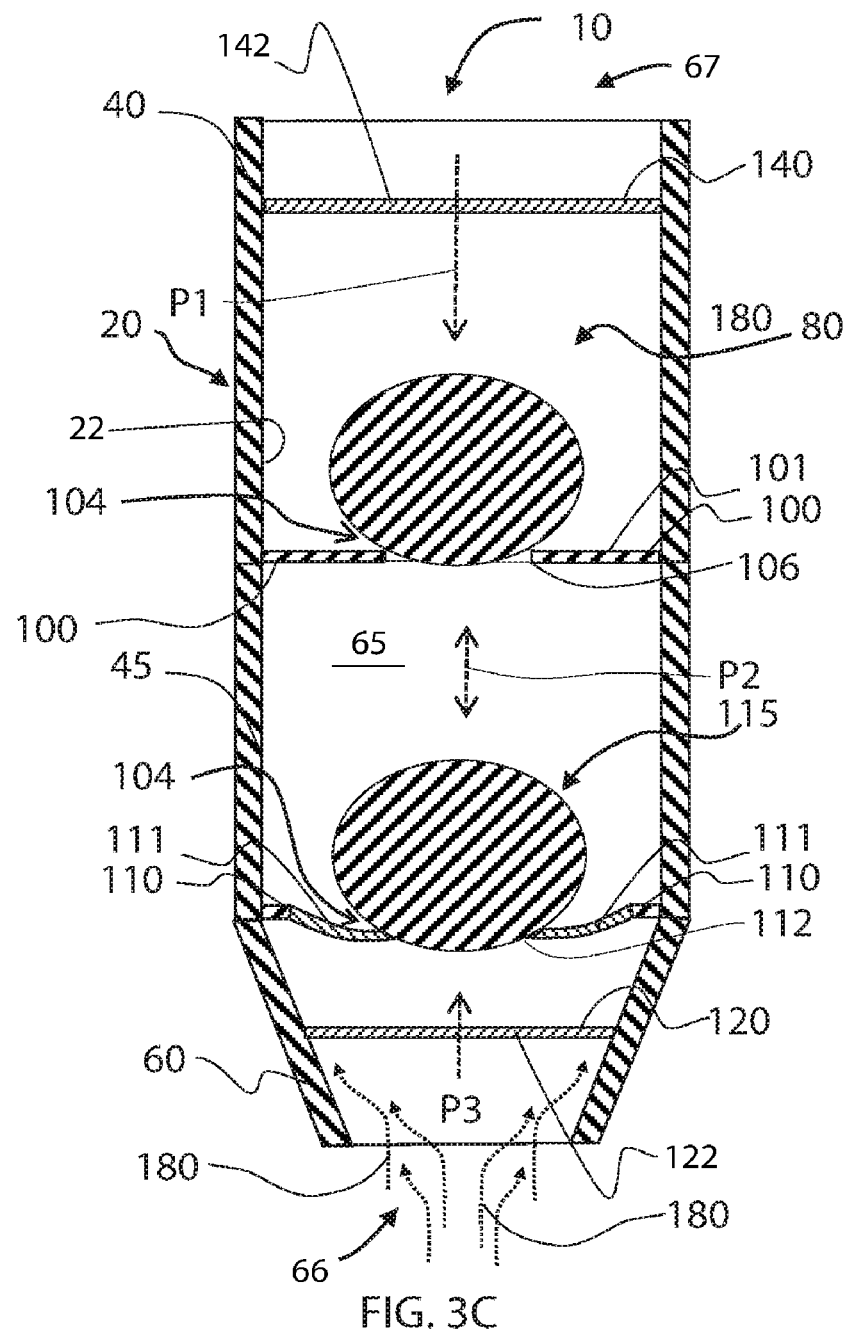
FIG. 3C is a cross-sectional view of a valve assembly in accordance with some embodiments of the present invention.

Referring to FIGS. 2-2C, in some embodiments, the valve assembly 10 includes at least one valve that includes a compliant section having a radial width greater than a radial width of the rigid section, as discussed above. For example, as depicted in FIGS. 2-2C, the first valve 80 includes a compliant section 620 disposed radially inward of a first annular rigid section 101 to act as a diaphragm, as explained above. The first opening 106 is formed in the first compliant section 620. The second valve seat 110 of the second valve 115 includes is formed primarily of a rigid material and includes a thin-walled compliant section 640. However, in an alternate embodiment, the second valve seat 110 may be formed similarly to the first valve seat 100 (i.e., a radial width of the second compliant section 640 is greater than a radial width of a second annular rigid section surrounding the second compliant section 640, as depicted in FIGS. 3-3C).

When the first spherical body 82 rests in the first opening 106 in the first compliant section 620, and thus providing a seal, the first compliant section 620 is deformed downwardly. The downward deformation of the first compliant section 620 increases the second pressure P2 in the second zone 45 due to the compression of the volume of the second zone 45 and the fact that the second valve 115 is sealed. The second pressure P2 in the second zone 45 may advantageously be monitored (e.g., using a pressure monitoring device coupled to the second zone 45) to detect the increase of pressure that results from the downward deformation of the first compliant section 620 to determine that no leak exists in the seals provided by the first spherical body 82 against the walls of the first opening and by the second spherical body 116 against the walls of the second opening 112. If, however, the downward deformation of the first compliant section 620 does not effect a corresponding increase in pressure in the second zone 45, then the first valve 80 and/or the second valve 115 has not sealed properly and a leak exists at the valve(s) that has not sealed properly.

In some embodiments, and as depicted in FIGS. 2B and 2C, the thin-walled compliant section 640 of the second valve 115 may be a collar 625 having a central reduced diameter area into which the rigid portion of the second valve seat 110 extends to hold the collar 625 in place. The collar 625 includes a central opening corresponding to the second opening 112, in which the second spherical body 116 sits in the closed position depicted in FIG. 2C.

Although the above description with regards to FIGS. 2-2C details the first valve 80 having a first compliant section 620 having a radial width greater than a radial width of the first rigid section 101 and the second valve 115 having a thin-walled compliant section 640, the first compliant section 620 may alternatively be thin-walled and the second compliant section 640 may alternatively have a radial width greater than a radial width of the second rigid section 111, as noted above and as depicted in FIGS. 3-3C.

Figure 4:
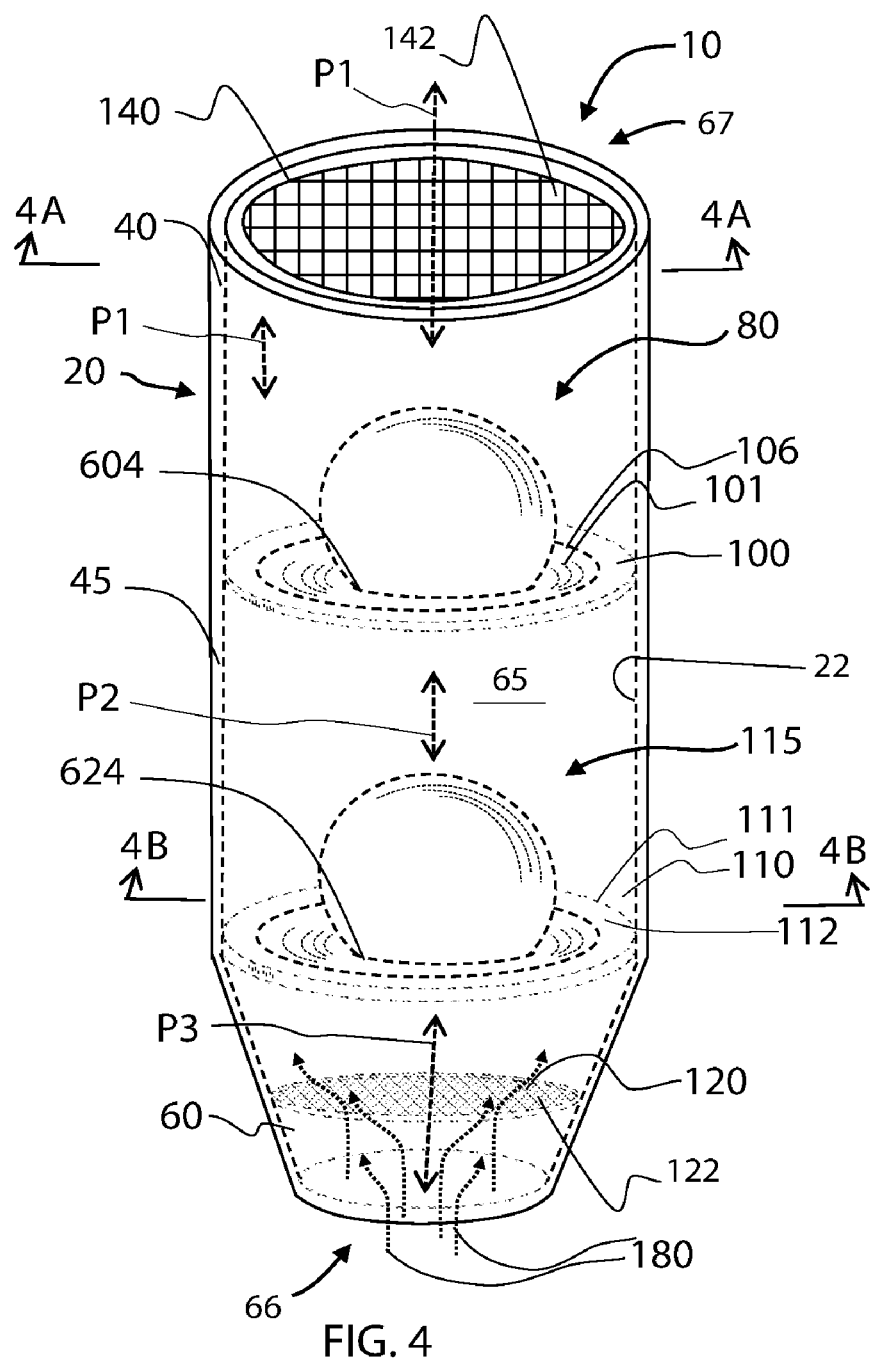
FIG. 4 is a perspective view of a valve assembly in accordance with some embodiments of the present invention.
Figure 4A:
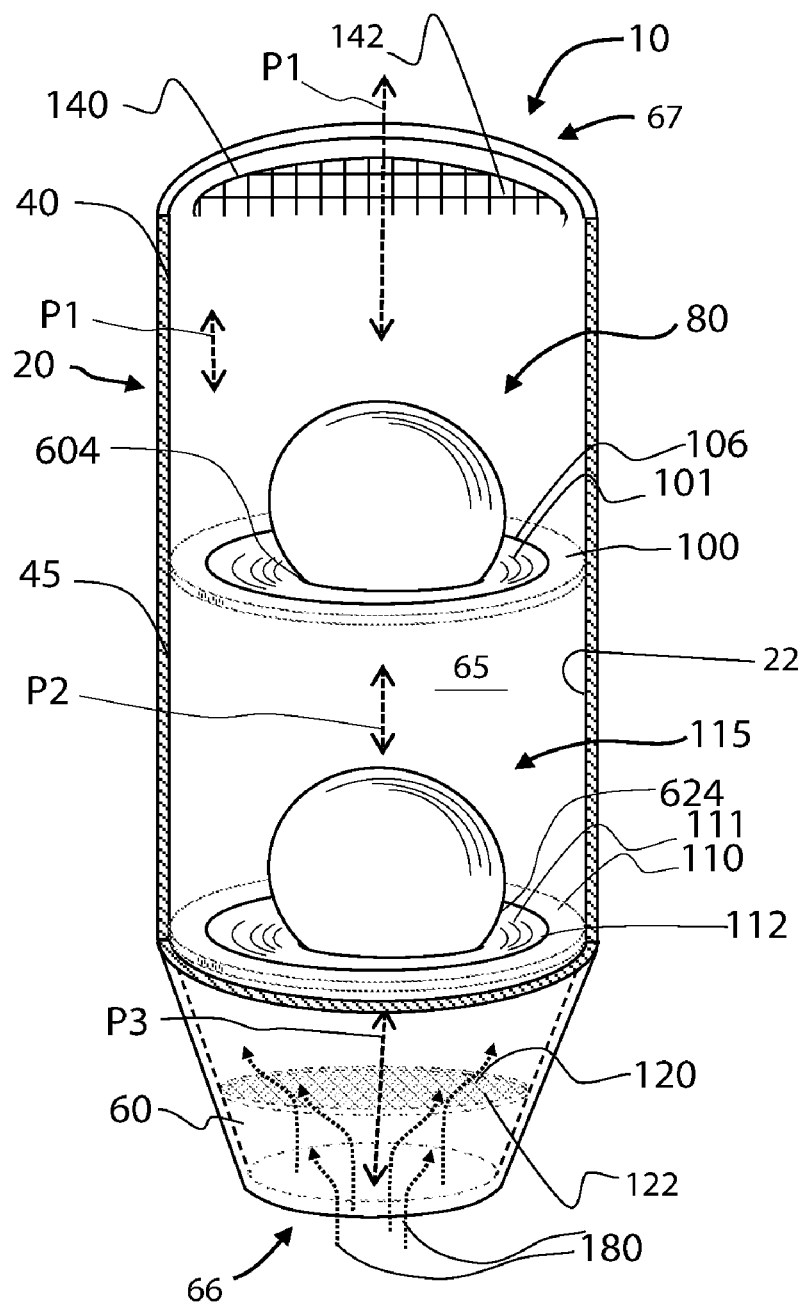
FIG. 4A is a cutaway view of a valve assembly in accordance with some embodiments of the present invention.
Figure 4B:
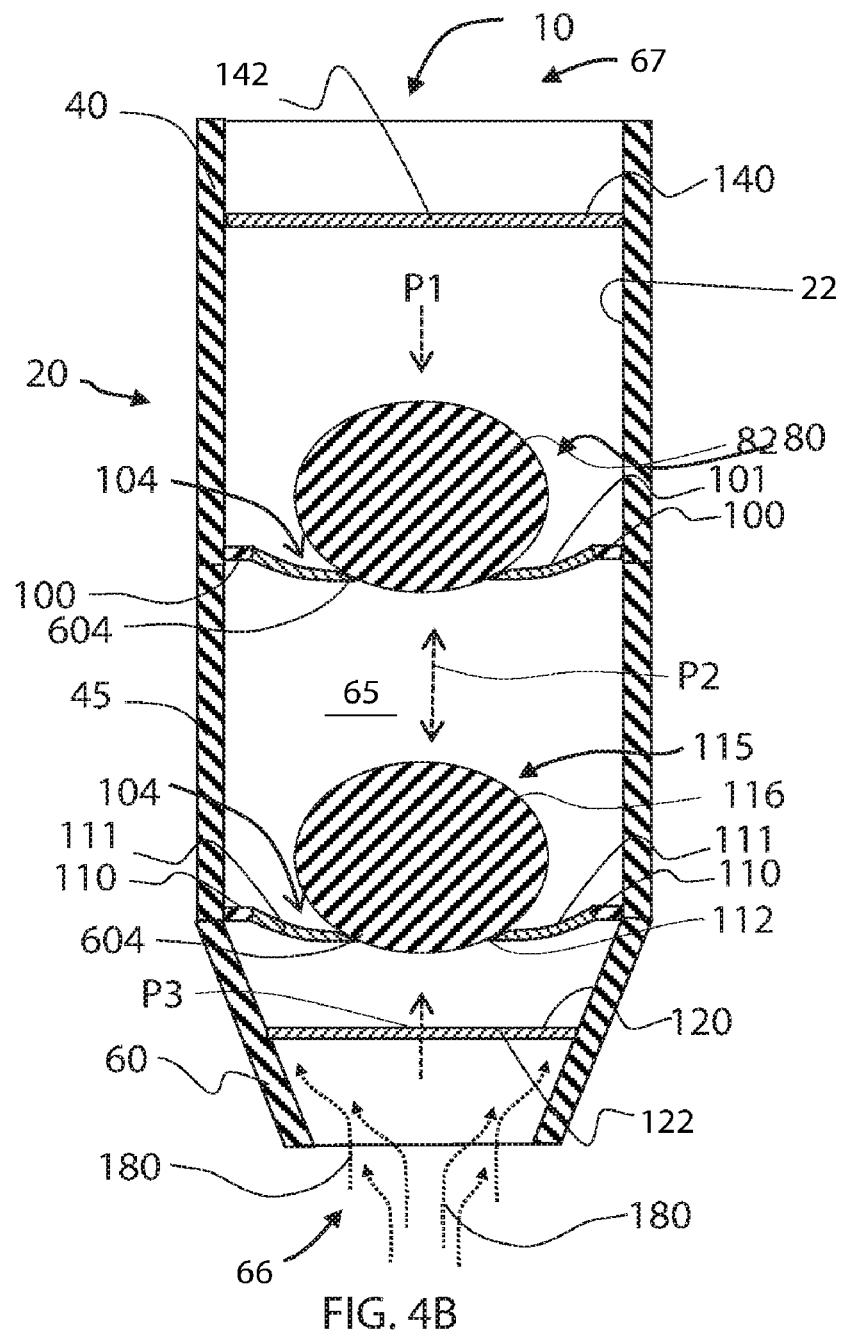
FIG. 4B is a cross-sectional view of a valve assembly in accordance with some embodiments of the present invention.

In some embodiments, and as depicted in FIGS. 4-4B, both the first and second valves 80, 115 may include respective first and second compliant sections 620, 640 each having radial widths greater than the radial widths of the corresponding first and second rigid sections 101, 111. In such an embodiment, the respective weights of the first and second spherical bodies 82, 116 are chosen to achieve a predetermined relative pressure difference in the second zone 45. In other words, the second pressure P2 in the second zone 45 may be varied depending the relative amounts of deformation of the first and second compliant sections 620, 640 when the respective first and second spherical bodies 82, 116 rest atop the compliant sections.

When the deformation of the first compliant section 620 is greater than the deformation of the second compliant section 640, the second zone 45 is compressed, resulting in an increase of the second pressure P2. When the deformation of the second compliant section 640 is greater than the deformation of the first compliant section 620, the second zone 45 expands, resulting in a decrease of the second pressure P2. If first and second compliant sections 620, 640 deform equally, the second pressure P2 will not be increased or decreased. As noted above, the relative deformations of the first and second compliant sections 620, 640 can be varied by choosing the respective weights of the first and second spherical bodies 82, 116 to achieve the desired pressure in the second zone 45. Also, the magnitude of the deformations of the first and second compliant sections 620, 640 can be predetermined even if the first and second spherical bodies 82, 116 have the same weight by using compliant materials having different shore hardness values between about 20 A and about 60 A, the lesser values resulting in more deformation. Examples of suitable materials for the compliant sections may include rubber, synthetic rubber, EPDM (Ethylene Propylene Diene Monomer), silicon, and combination thereof. Examples of suitable materials for the rigid sections may include PVC (Polyvinyl chloride), metal, HDPE (High Density Polyethylene), or the like.

Figure 5:
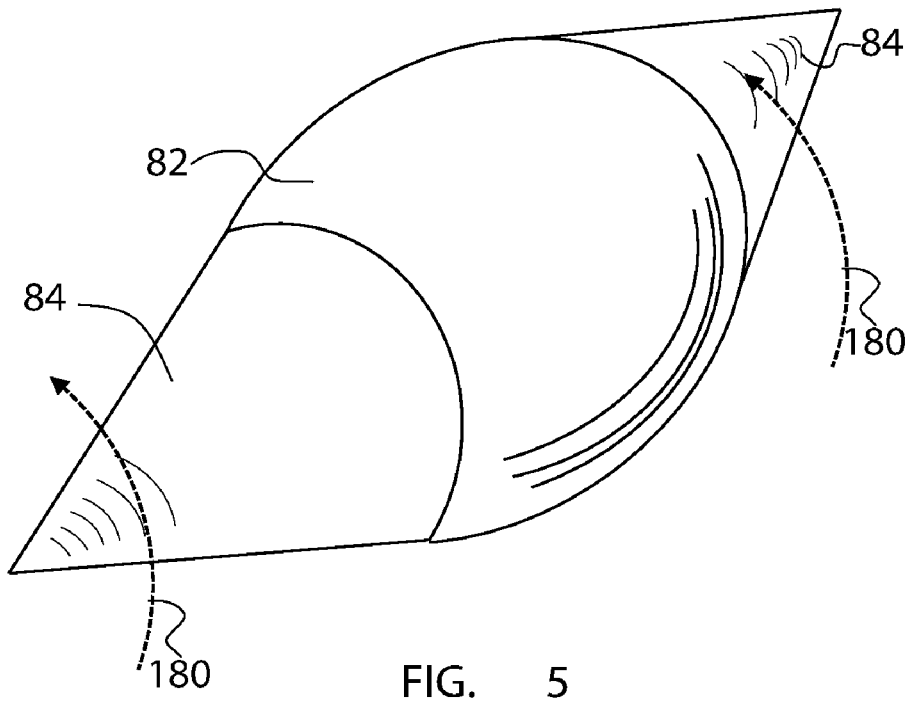
FIG. 5 is a perspective view of a sealing member of a valve assembly in accordance with some embodiments of the present invention.

Although the following description of FIGS. 5-8 will be made with respect to the first spherical body 82, the following is also applicable to the second spherical body 116. FIG. 5 depicts a first spherical body 82 for use in a valve assembly (e.g., valve assembly 10) in accordance with some embodiments of the present disclosure. In some embodiments, two first guides 84 may be mounted to the spherical body 116 on opposite sides. The two first guides 84 are configured to be mounted in and moveable along two corresponding first tracks which will be discussed in greater detail below with regards to FIGS. 9-10A. The air flow 180 facilitates rotation of the first spherical body 82 and, consequently, movement of the spherical body 82 and its corresponding two first guides 84 along the corresponding first tracks. The spinning of the first spherical body 82 advantageously facilitates removal of any scum that has accumulated on the first spherical body 82 which would adversely affect sealing of the first valve 80.

Figure 6:
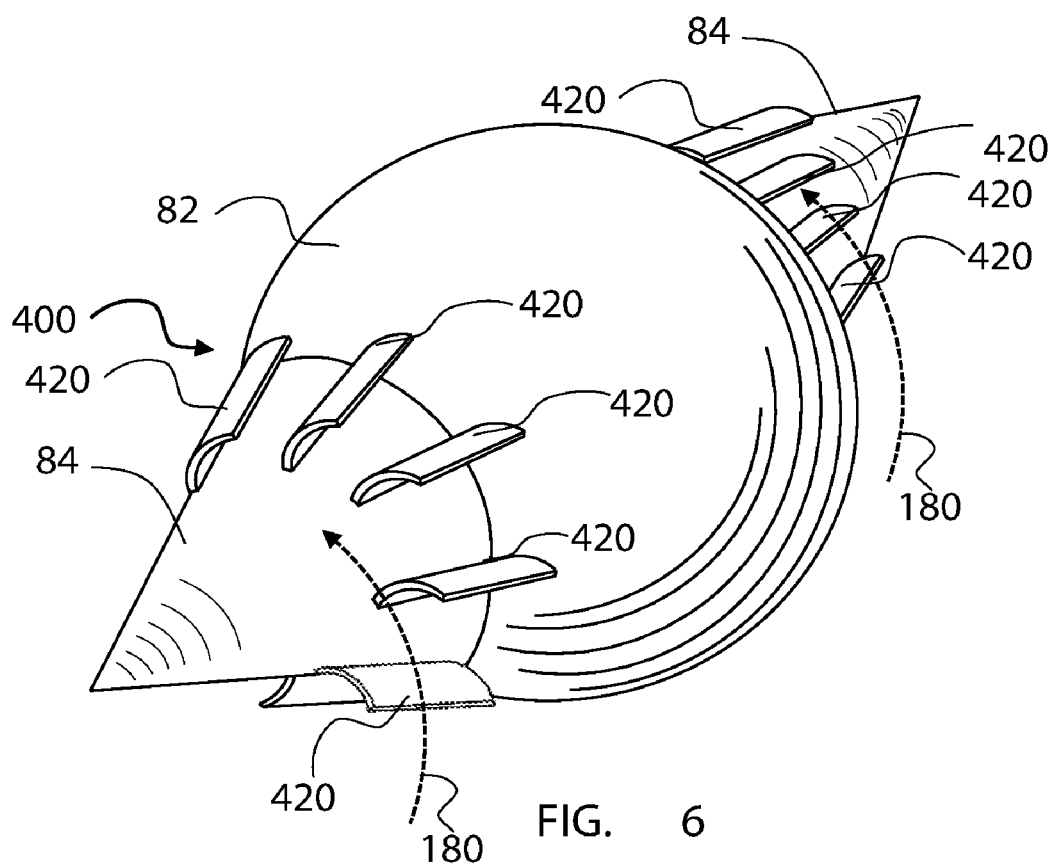
FIG. 6 is a perspective view of a sealing member of a valve assembly in accordance with some embodiments of the present invention.

In some embodiments, and as depicted in FIG. 6, a plurality of first turbulators 400 may be coupled to and arranged about each of the two first guides 84. In some embodiments, the plurality of first turbulators 400 may be a plurality of fins 420. The plurality of first turbulators 400 aid in the rotation of the first spherical body 82 and the corresponding two first guides 84 to facilitate improved movement along the corresponding first tracks due to the increased rotational velocity of the first spherical body 82. The increased rotational velocity also further improves the removal of any scum that has accumulated on the first spherical body 82.

Figure 7:
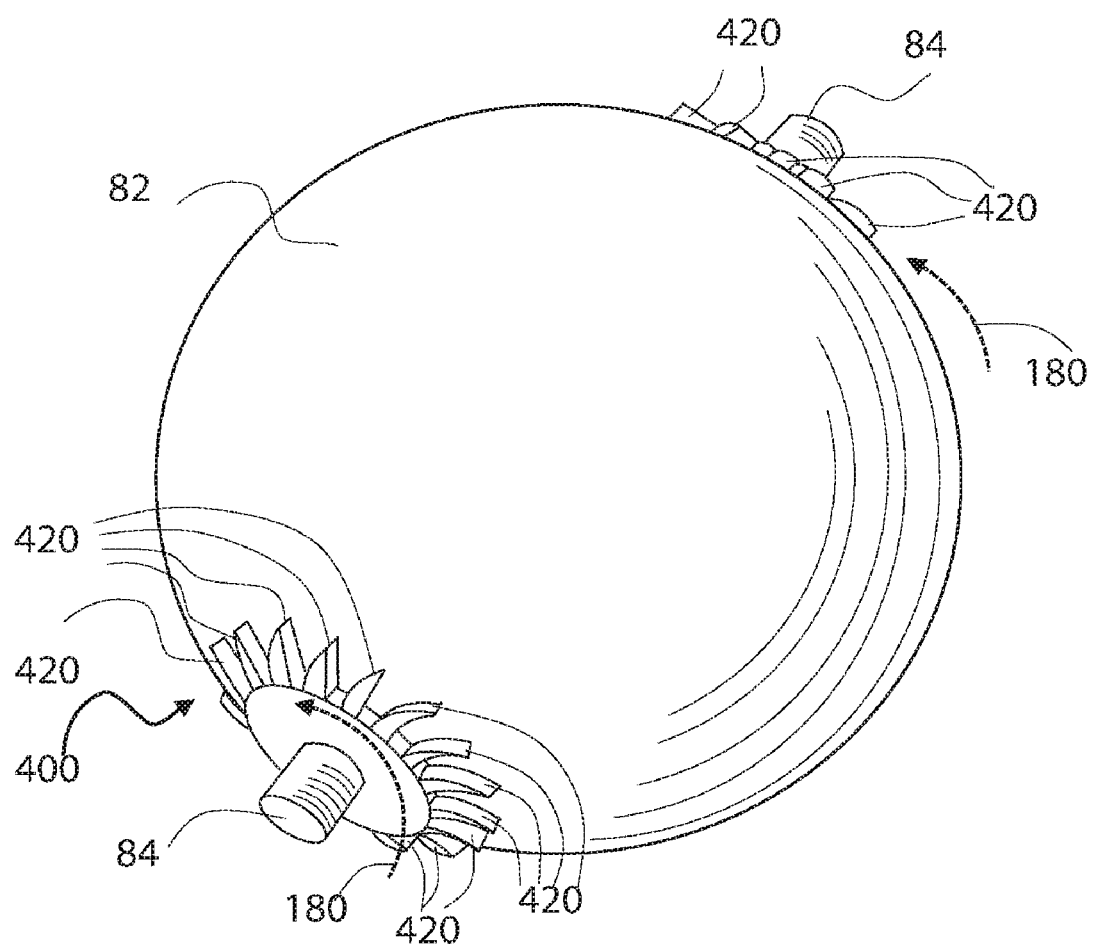
FIG. 7 is a perspective view of a sealing member of a valve assembly in accordance with some embodiments of the present invention.

In some embodiments, and as depicted in FIGS. 5 and 6, the two first guides 84 may be conical. In some embodiments, the two first guides 84 may alternatively be shafts protruding from opposite ends of the first spherical body 82, as illustrated in FIG. 7. In such an embodiment, the plurality of first turbulators 400 are disposed at a base of each shaft. Regardless of the shape of the two first guides 84, the two first guides 84 may be formed as a unitary structure with the first spherical body 82 or may be coupled to the first spherical body 82 adhesives, fixation elements, or the like.

Figure 8:
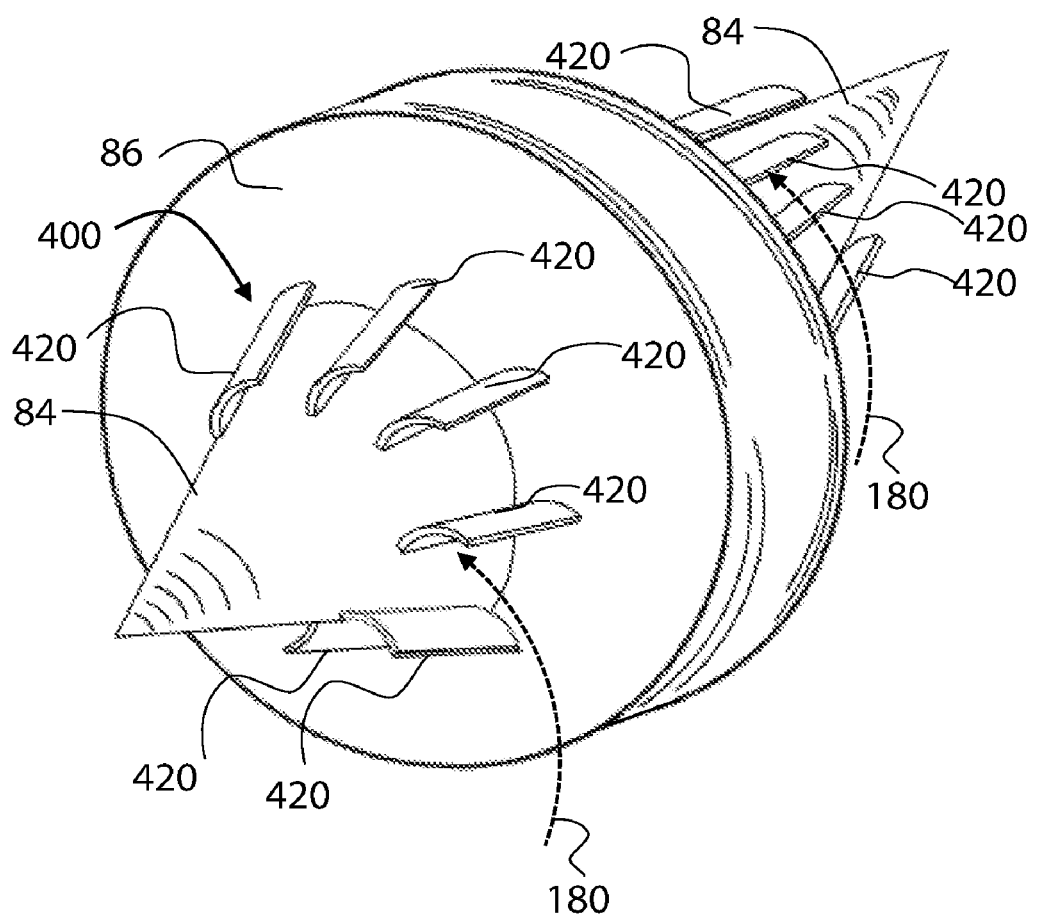
FIG. 8 is a perspective view of a sealing member of a valve assembly in accordance with some embodiments of the present invention.

FIG. 8 depicts a first sealing member for use in a valve assembly (e.g., valve assembly 10) in accordance with some embodiments of the present invention. As illustrated in FIG. 8, in some embodiments, the first sealing member may alternatively be a first disc 86 (i.e., cylindrical) having the two first guides 84 on opposite flat sides of the first disc 86. In such an embodiment, the first opening 106 in the first valve seat 100 may be a slot (as opposed to a hole) to form a seal with the first disc 86.

Figure 9:
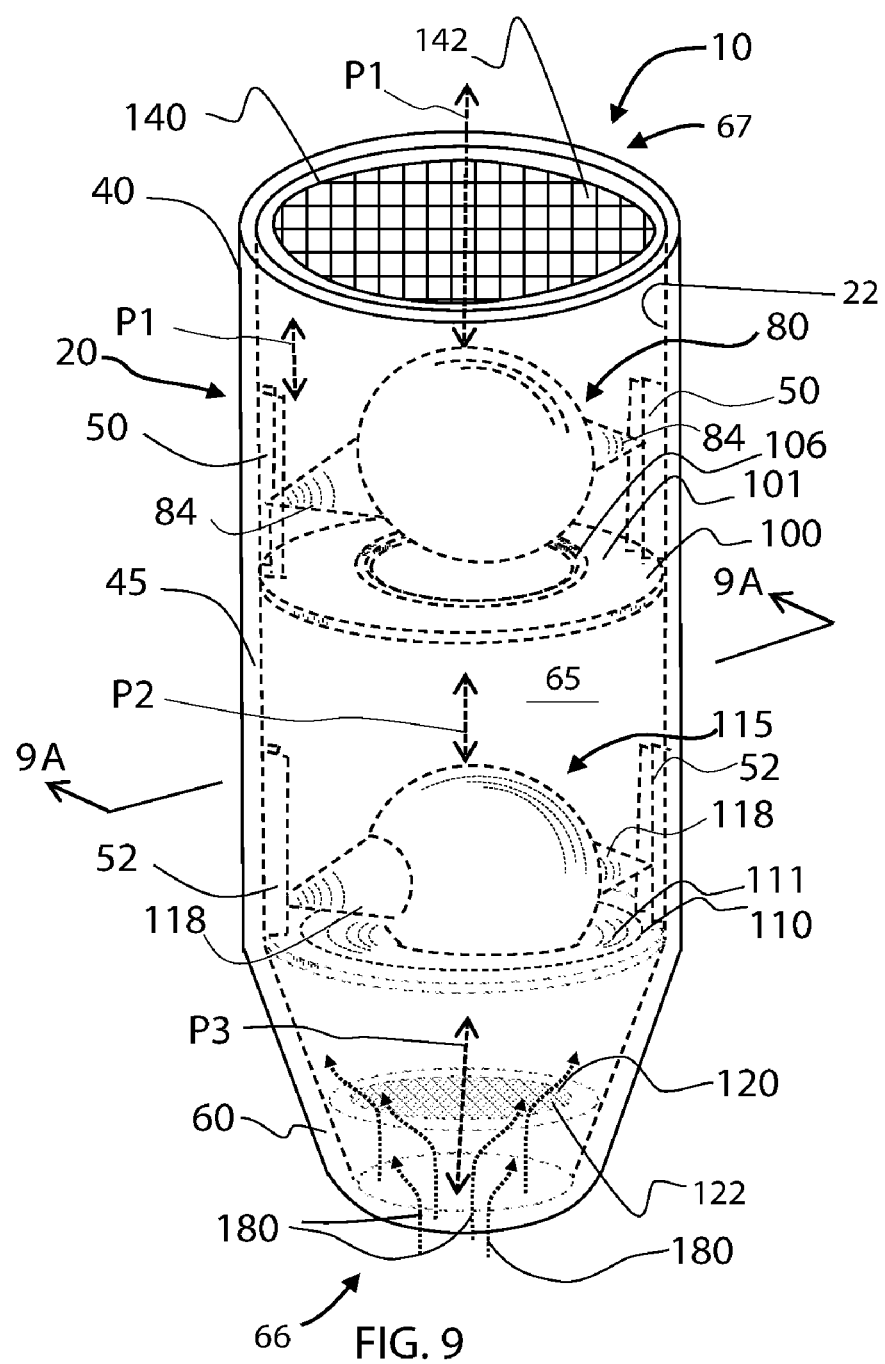
FIG. 9 is a perspective view of a valve assembly in accordance with some embodiments of the present invention.
Figure 9A:
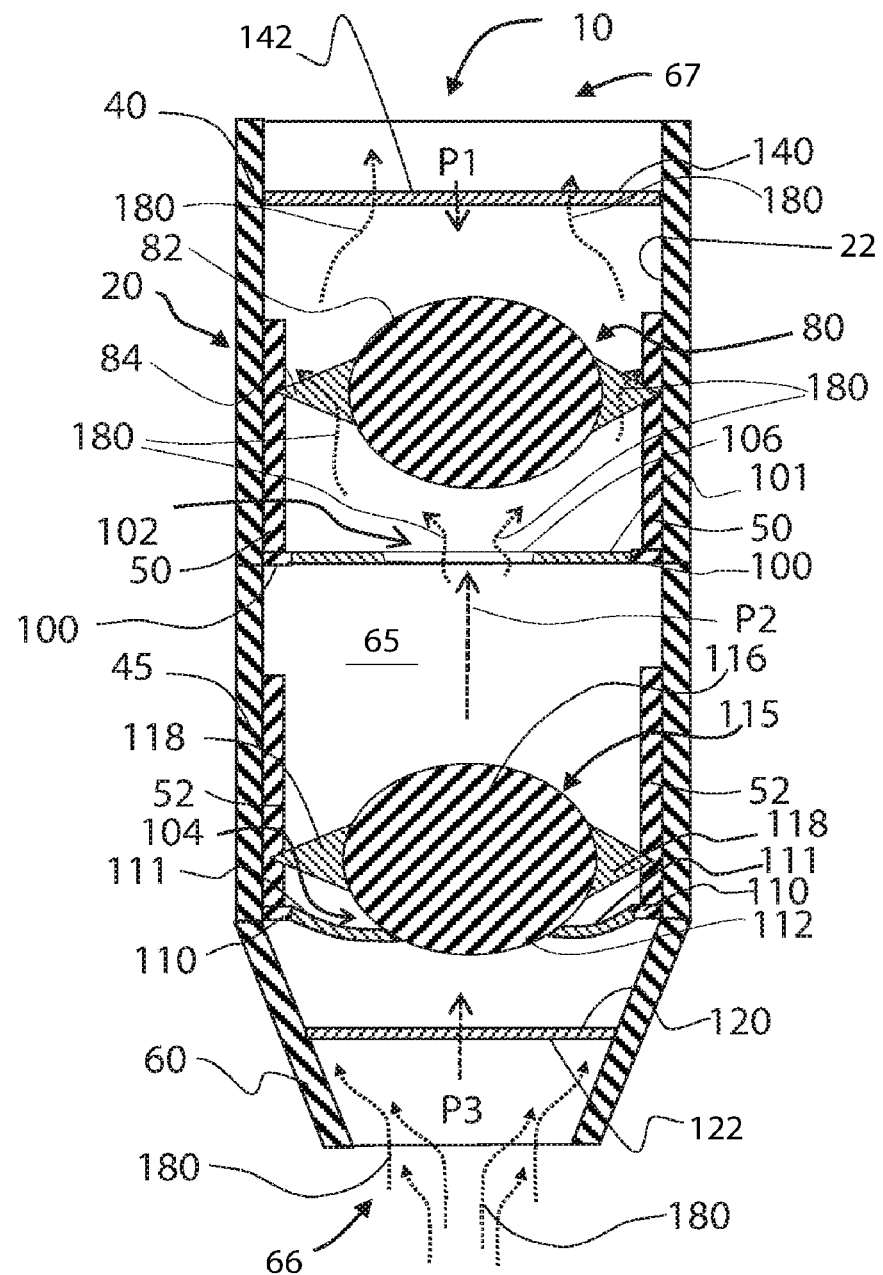
FIG. 9A is a cross-sectional view of a valve assembly in accordance with some embodiments of the present invention.

FIGS. 9 and 9A depict a valve assembly in accordance with some embodiments of the present invention. Specifically, FIGS. 9 and 9A depict the valve assembly 10 incorporating the spherical body of FIG. 5. As shown in FIGS. 9 and 9A, in some embodiments, the valve assembly 10 may include two first guide rails 50 and two second guide rails 52 corresponding to the first and second valves 80, 115, respectively. The ends of two first guides 84 and two second guides 118 of the first and second spherical bodies 82, 116, respectively, are inserted into slots formed in respective ones of the two first and second guide rails 50, 52 to facilitate vertical movement of the first and second spherical bodies 82, 116 between a closed position and an open position. For example, when the second pressure P2 is greater than the first pressure P1, the pressure difference forces the first valve 80 to open by pushing the first spherical body 82 upward along the two first guides 84. In addition, the air flow 180 rotates the spherical body 82 about an axis passing through the two first guides 84 as the first spherical body 82 moves upwards, thus advantageously ridding the spherical body 82 of accumulated scum. As explained above, this rotation is further improved and sped up by the incorporation of fins 420.

The two first and second guide rails 50, 52 may be separate elements coupled to an inner wall of the housing 20 or may be formed with the housing 20 as a unitary structure. In some embodiments, the two first and second guide rails 50, 52 may alternatively be coupled or molded with the corresponding first and second valve seats 100, 110.

Figure 10:
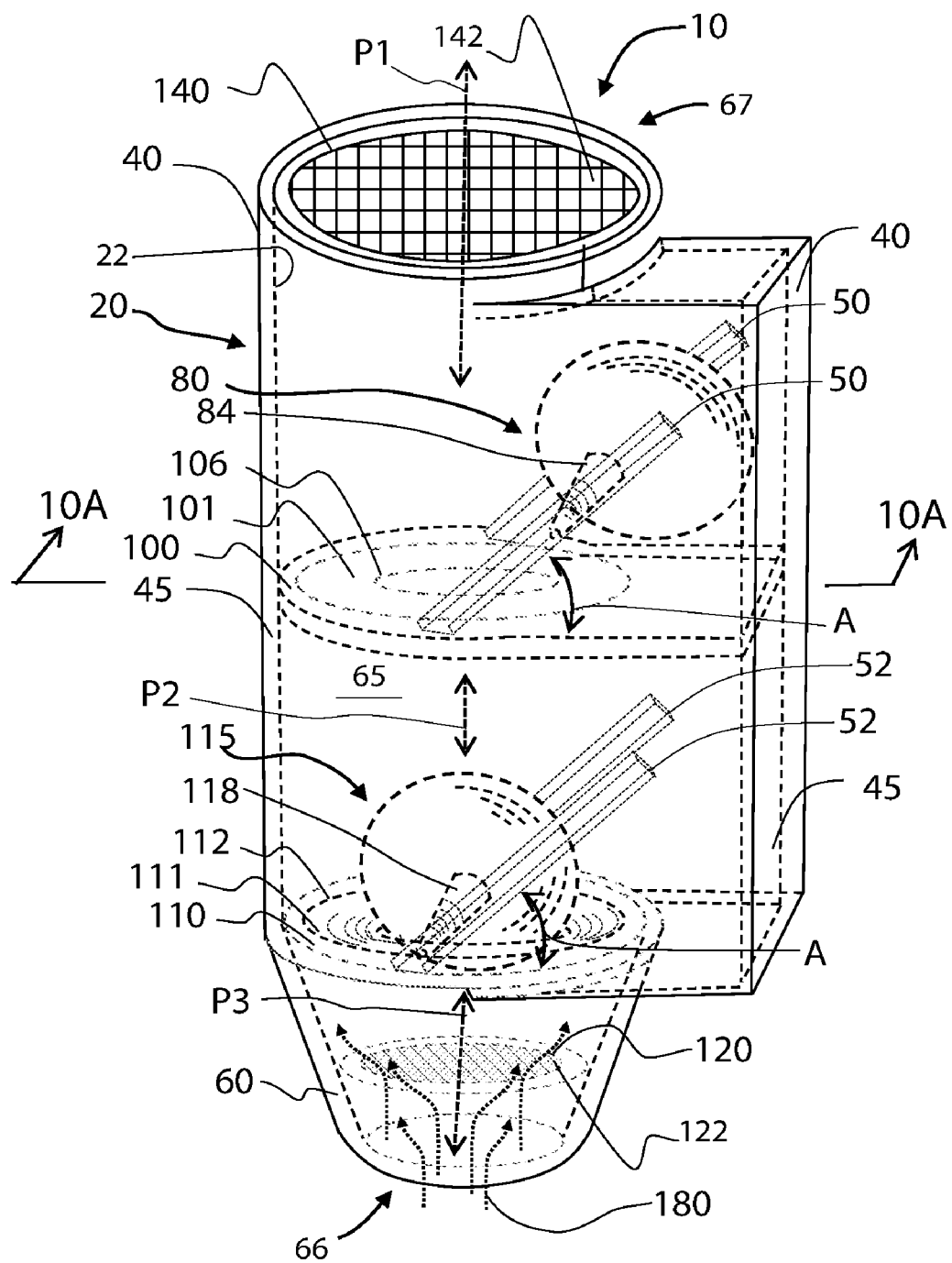
FIG. 10 is a perspective view of a valve assembly in accordance with some embodiments of the present invention.
Figure 10A:
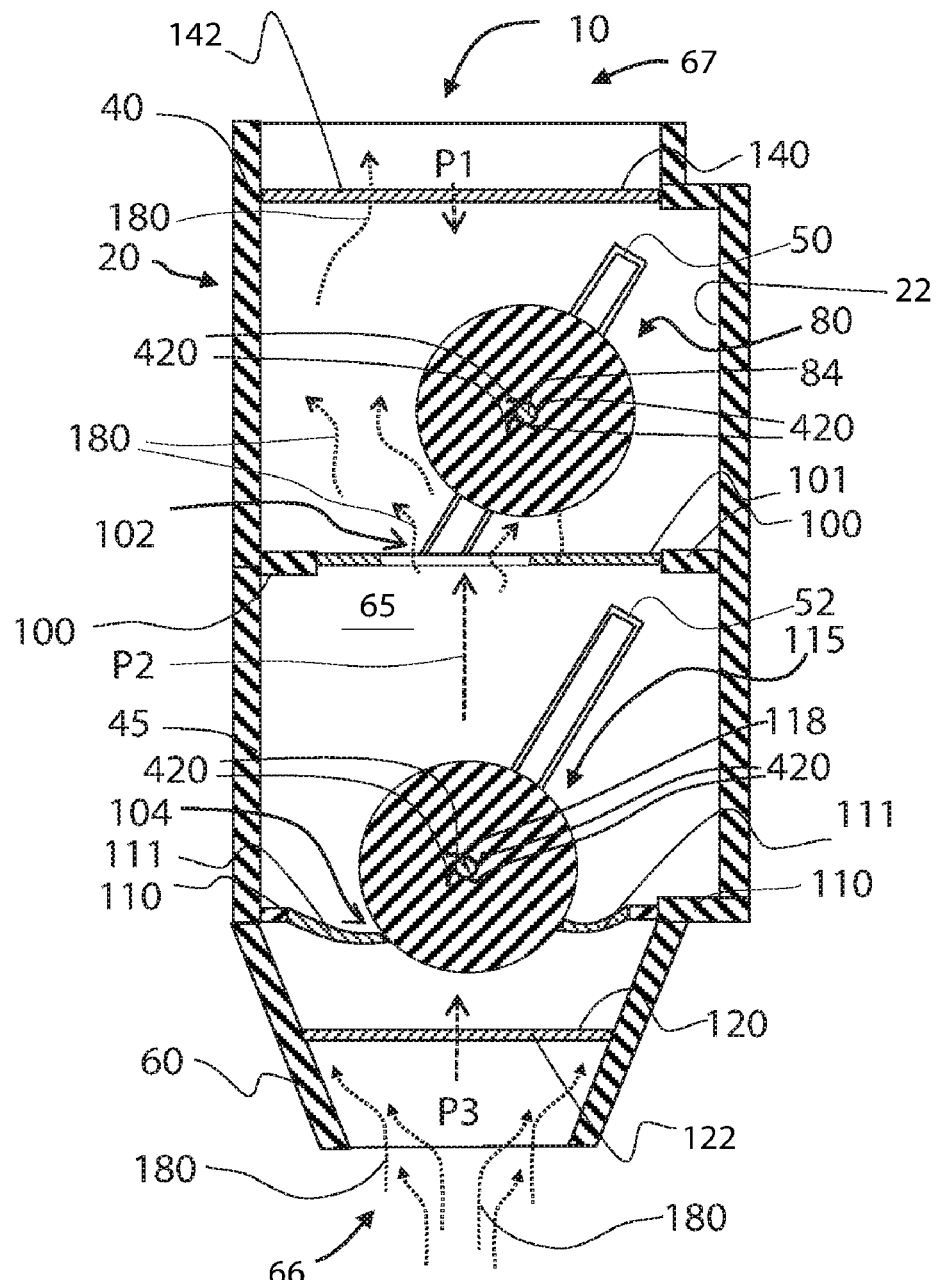
FIG. 10A is a cross-sectional view of a valve assembly in accordance with some embodiments of the present invention.

FIGS. 10 and 10A depict a valve assembly 10 in accordance with some embodiments of the present invention. As illustrated in FIGS. 10 and 10A, in some embodiments, the housing 20 may be configured to accommodate two first and second guide rails 50, 52 disposed at an angle A with respect to a plane in which each corresponding valve seat is disposed. In some embodiments, the angle A may be between about 45° and about 89°. Disposing the guard rails at an angle advantageously allows for the passage of more air flow 180 through the first and/or second openings 106, 112 because the first and second spherical bodies 82, 116 are disposed outside of the air flow 180.

Figure 11:
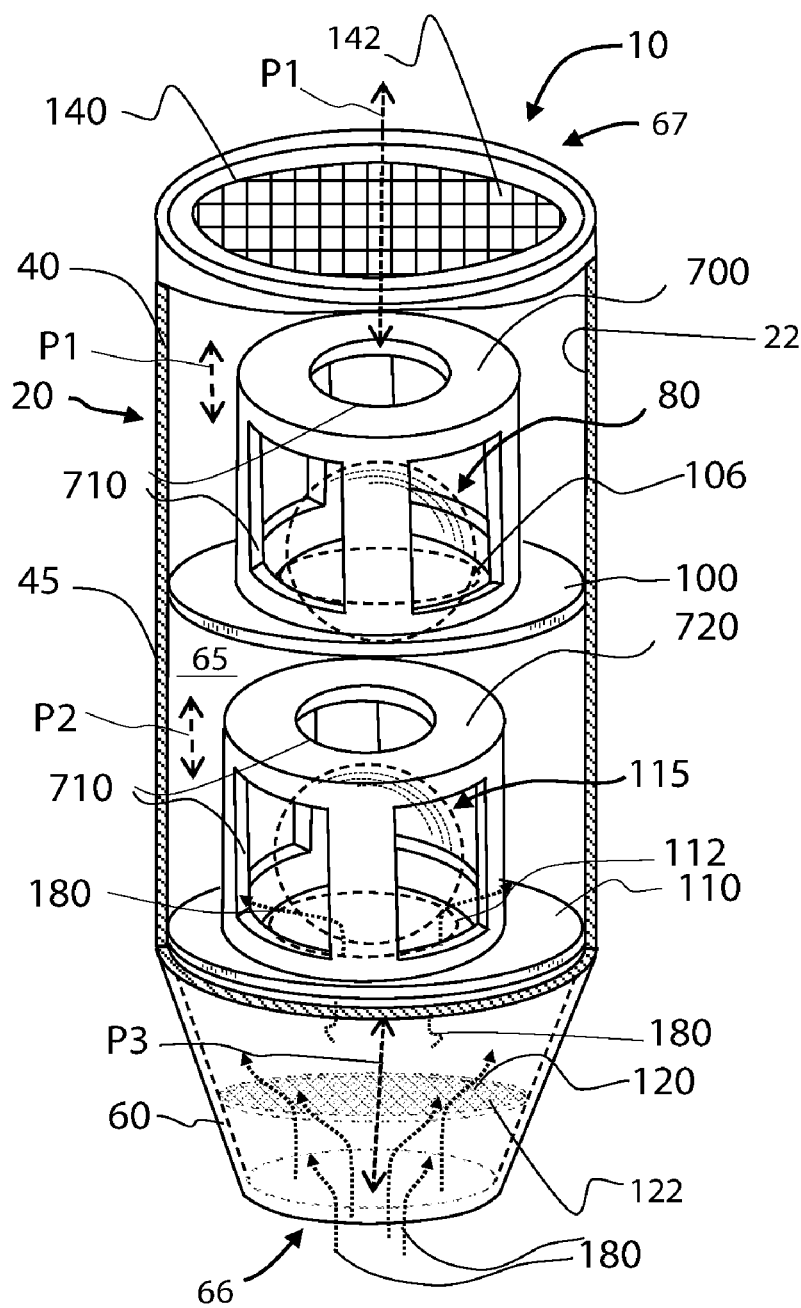
FIG. 11 is a cutaway view of a valve assembly in accordance with some embodiments of the present invention.

FIG. 11 depicts a cutaway view of a valve assembly in accordance with some embodiments of the present invention. In some embodiments, and as depicted in FIG. 11, the valve assembly 10 may include a first cage 700 coupled to the first valve seat 100 about the first opening 106 and a second cage 720 coupled to the second valve seat 110 about the second opening 112. As depicted in FIG. 11, in some embodiments, the first and second cages 700, 720 are cylindrical and have an opening at one side large enough to receive the first and second spherical bodies 82, 116, respectively, within the cages. The first and second cages 700, 720 further include a plurality of openings disposed about and at the top of each cage to allow for the air flow 180 to pass through the cages. The first and second cages 700, 720 are configured to limit the range of motion of the first and second spherical bodies 82, 116, respectively, to advantageously prevent the spherical bodies from moving around violently in high flow applications (e.g., above about 20 pounds per square inch (psi)). The first and second cages 700, 720 may be coupled to their respective valve seats or, alternatively, formed as one unitary structure with their respective valve seats.

Figure 12:
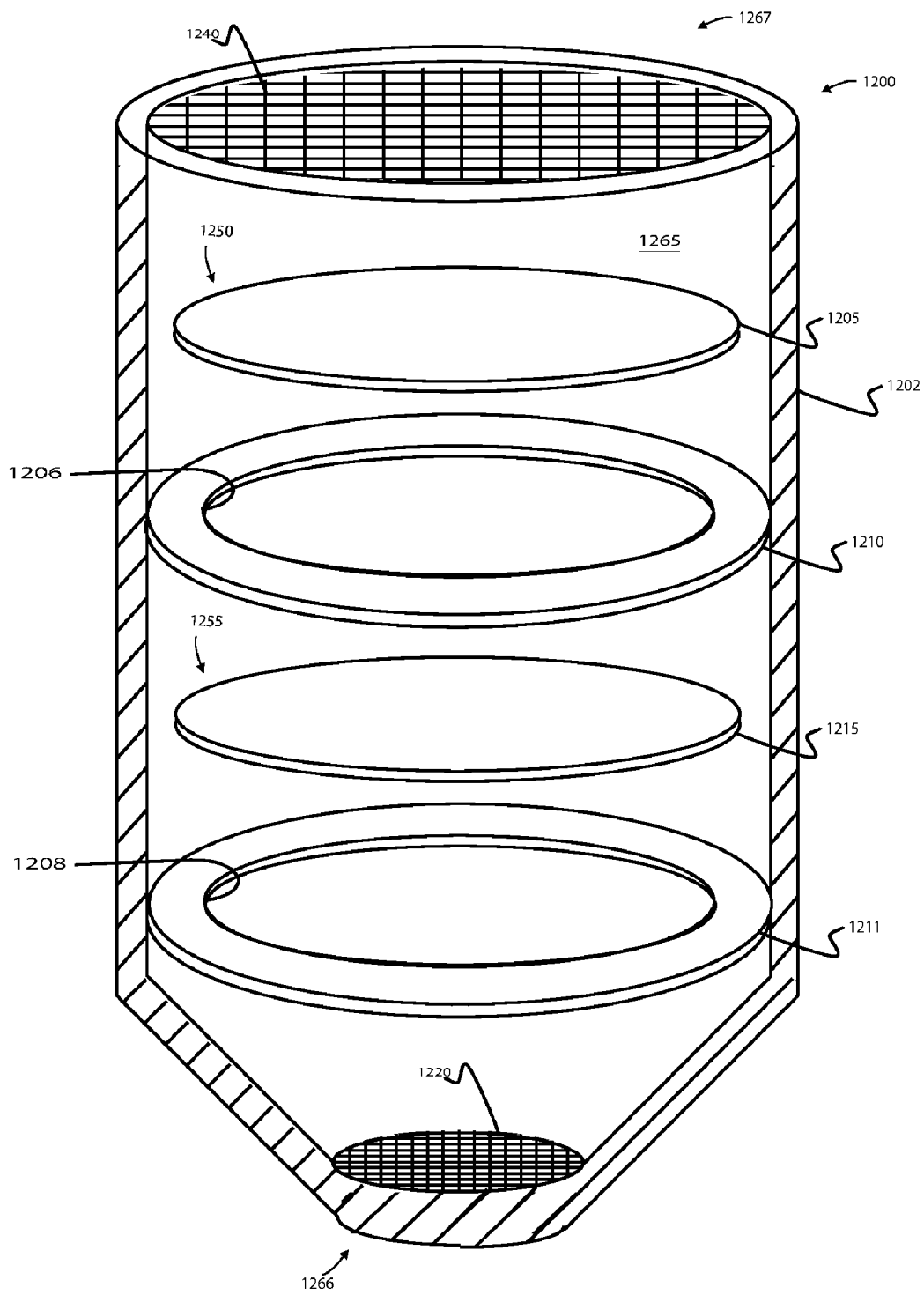
FIG. 12 is a schematic cross-sectional view of a valve assembly in accordance with some embodiments of the present invention.

FIG. 12 depicts a cutaway view of a valve assembly 1200 in accordance with some embodiments of the present invention. In some embodiments, and as depicted in FIG. 12, the valve assembly 1200 incudes a housing 1202 defining an interior volume 1265 and a first valve 1250 and a second valve 1255 disposed in the interior volume 1265. The first and second valves 1250, 1255 include first and second discs 1205, 1215, respectively, as sealing members. The first and second valves 1250, 1255 further include first and second valve seats 1210, 1211, respectively, having first and second openings 1206, 1208, respectively. In such an embodiment, the first and second sealing members (i.e., the first and second discs 1205, 1215) have diameters that are larger than their respective first and second openings 1206, 1208. In such embodiments, the first and second valve seats 1210, 1211 may be formed of either one of the ridged or compliant materials discussed above. Similar to the embodiments of valve assemblies discussed above, the valve assembly 1200 may further include an inlet 1266, and outlet 1267, a first filter element 1220 disposed at or proximate to the inlet 1266, and a second filter element 1240 disposed at or proximate to the outlet 1267. Although not described here for brevity, the valve assembly 1200 may also include elements in one or more of the embodiments of valve assemblies discussed above.

Figure 12A:
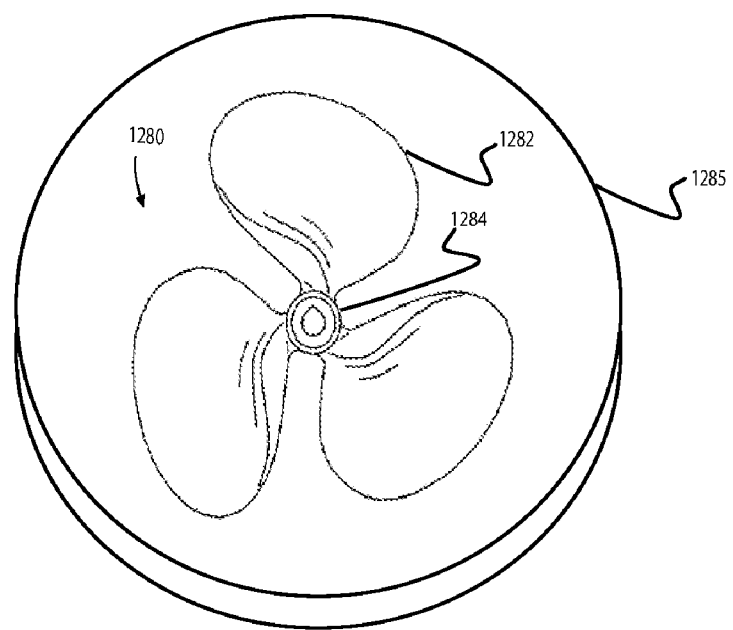
FIG. 12A is a perspective bottom view of a sealing member for use with a valve assembly in accordance with some embodiments of the present invention.

FIG. 12A depicts a perspective view of a bottom of the first disc 1205 of the valve assembly depicted in FIG. 12. In some embodiments, the first disc 1205 may include a turbulator 1280. In some embodiments, the turbulator 1280 may include a plurality of fins 1282 extending from a central body 1284 which is coupled to the bottom surface of the first disc 1205. In some embodiments, both the first and second discs 1205, 1215 include turbulators 1280 to advantageously facilitate the removal of any scum that has accumulated on the discs by rotating the discs as air flows past the discs. It should be noted, however, that the turbulator 1280 may be embodied as an alternative structure that is capable of rotating the discs as air flows past the discs.

Figure 12B:
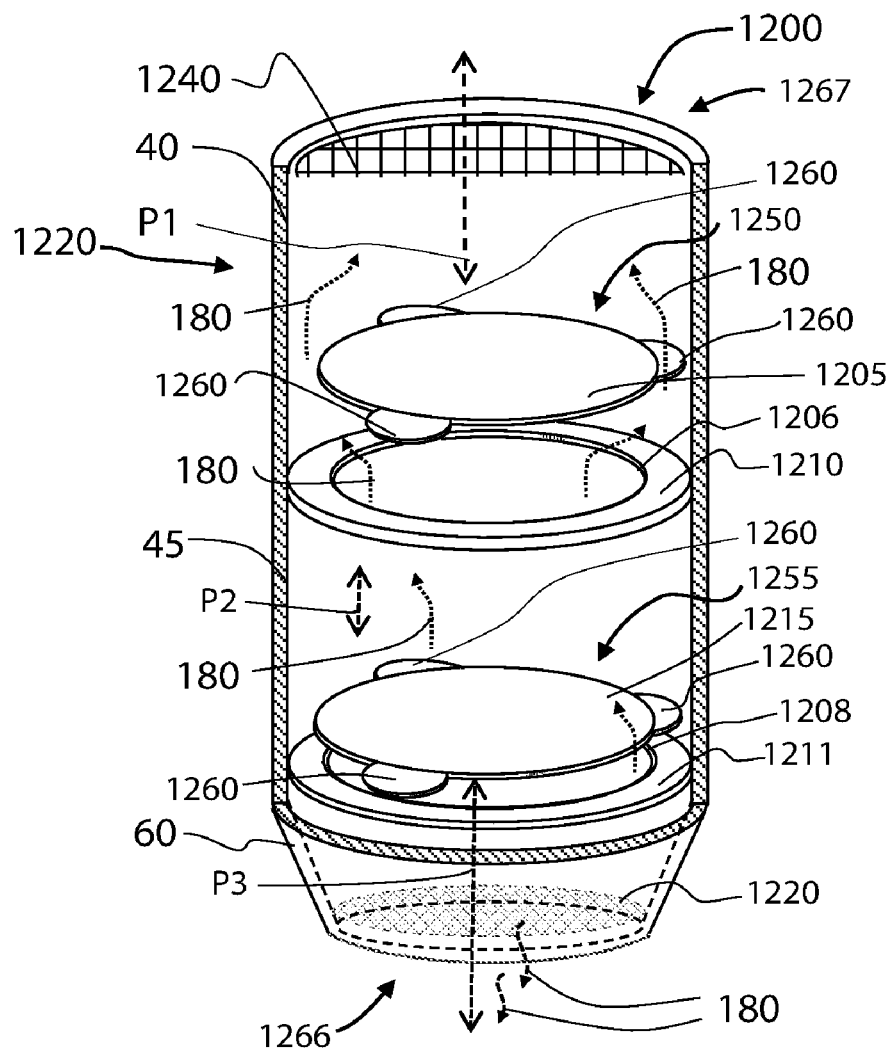
FIG. 12B is a cutaway view of a valve assembly in accordance with some embodiments of the present invention.

In some embodiments, and as depicted in FIG. 12B, the first and second discs 1205, 1215 may each include a plurality of alignment members 1250 protruding radially outward from a peripheral edge of each of the first and second discs, 1205, 1215. A circle circumscribing the plurality of alignment members 1250 has a diameter less than an inner diameter of the housing 1220 to ensure that each disc is correctly aligned above its corresponding valve seat to provide a proper seal when abutting against the valve seat.

Figure 13:
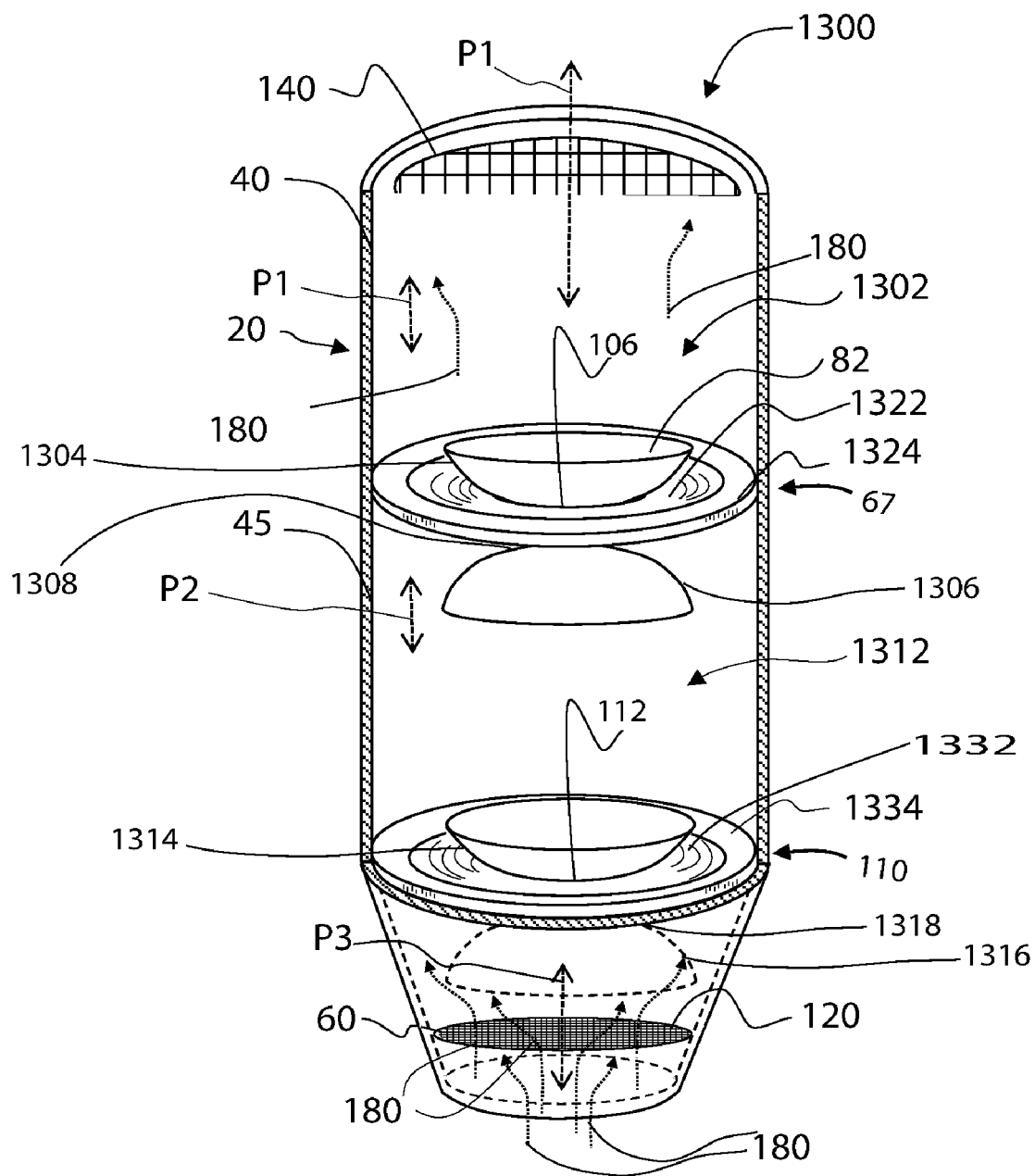
FIG. 13 is a cutaway view of a valve assembly in accordance with some embodiments of the present invention.

FIG. 13 depicts a cutaway view of a valve assembly 1300 in accordance with some embodiments of the present invention. In some embodiments, and as depicted in FIG. 13, the first and second sealing members 1302, 1312 may be shaped like an hourglass. The first sealing member 1302 includes a first upper hemispherical section 1304, a first lower hemispherical section 1306, and a first neck section 1308 connecting the first upper and lower hemispherical sections 1304, 1306. The first neck section 1308 has a first diameter less than a first opening diameter of the first opening 106 of the first valve seat 100. In order to provide a seal when abutting against the first valve seat 100, a portion of each of the first upper and lower hemispherical sections 1304, 1306 is sized larger than the first opening 106. Similarly, the second sealing member 1312 includes a second upper hemispherical section 1314, a second lower hemispherical section 1316, and a second neck section 1318 connecting the second upper and lower hemispherical sections 1314, 1316. The second neck section 1318 has a second diameter less than a second opening diameter of the second opening 112 of the second valve seat 110. In order to provide a seal when abutting against the second valve seat 110, a portion of each of the second upper and lower hemispherical sections 1314, 1316 is sized larger than the second opening 112.

In some embodiments, the first valve seat 100 may include a first flexible membrane 1322 coupled to and disposed radially within a first rigid ring 1324, which is coupled to an interior wall of the housing 20. In such an embodiment, the first opening 106 is formed in the first flexible membrane 1322. The first flexible membrane 1322 may be formed of the compliant material discussed above and may have a shore hardness between about 50 A and about 80 A and a vertical thickness between about 0.5 mm and about 1.5 mm. The first rigid ring 1324 may be formed of the rigid material discussed above. In some embodiments, the first valve seat 100 may alternatively be entirely formed of a rigid material.

In some embodiments, the second valve seat 110 may include a second flexible membrane 1332 coupled to and disposed radially within a second rigid ring 1334, which is coupled to an interior wall of the housing 20. In such an embodiment, the second opening 112 is formed in the second flexible membrane 1332. The second flexible membrane 1332 may be formed of the compliant material discussed above and may have a shore hardness between about 50 A and about 80 A and a vertical thickness between about 0.5 mm and about 1.5 mm. The second rigid ring 1334 may be formed of the rigid material discussed above. In some embodiments, the second valve seat 110 may alternatively be entirely formed of a rigid material. In some embodiments, the first and second sealing members 1302, 1312 may be formed of the compliant material discussed above. In such an embodiment, the corresponding valve seats may be formed of either the compliant or rigid materials. In some embodiments, the first and second sealing members 1302, 1312 may alternatively be formed of the rigid material discussed above. In such an embodiment, the corresponding valve seats may be formed of either the compliant or rigid materials. However, when the first and/or second sealing members 1302, 1312 and the corresponding valve seat(s) are formed of the rigid material, the corresponding rigid valve seat should include a compliant portion surrounding the opening (e.g., the collar 625 discussed above) to ensure a proper seal with the rigid sealing member.

Figure 14:
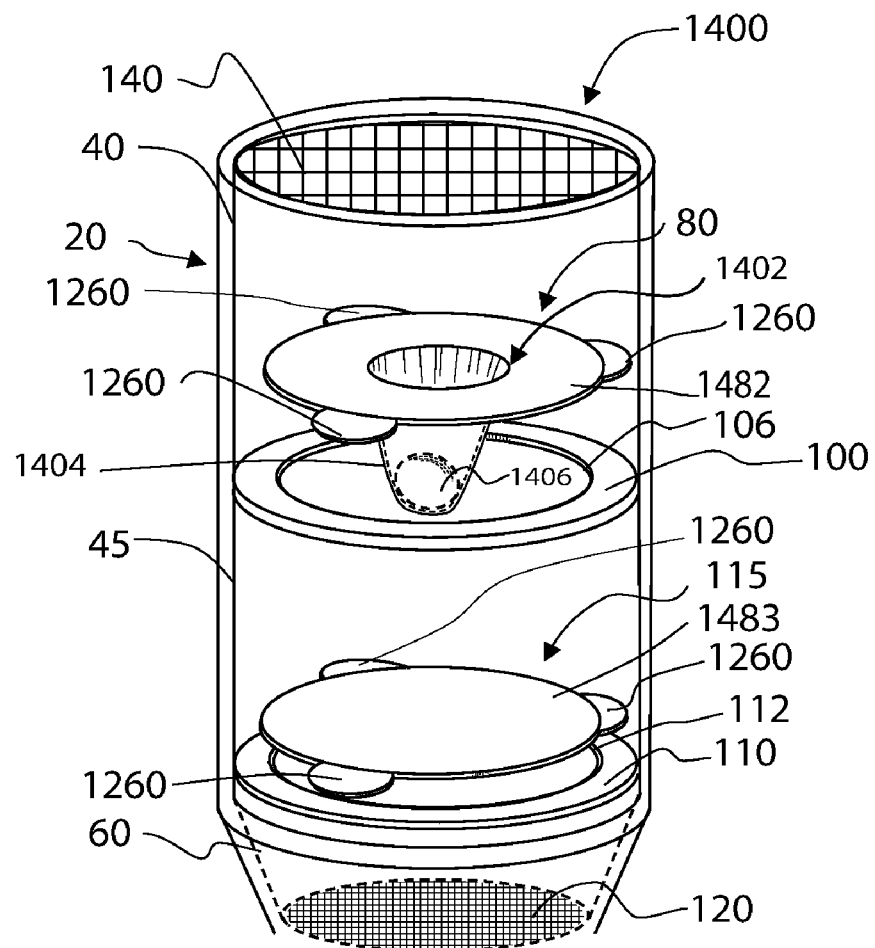
FIG. 14 is a cutaway view of a valve assembly in accordance with some embodiments of the present invention.

FIG. 14 depicts a valve assembly 1400 in accordance with some embodiments of the present invention. In some embodiments, and as depicted in FIG. 14, at least one of a first sealing member 1482 and a second sealing member 1483 of the first and second valves 80, 115, respectively, includes a central opening 1402, a non-permeable sac 1404 coupled to and surrounding the central opening 1402, and a weight configured to stretch the non-permeable sac 1404 downwards and press the first and/or second sealing member 1482, 1483 against a corresponding first and/or second valve seat 100, 110. In some embodiments, the first sealing member 1482 includes the central opening 1402, non-permeable sac 1404, and the weight. In such an embodiment, and as depicted in FIG. 14, the second sealing member 1483 may be a disc, as described above with regards to FIG. 12.

Figure 14A:
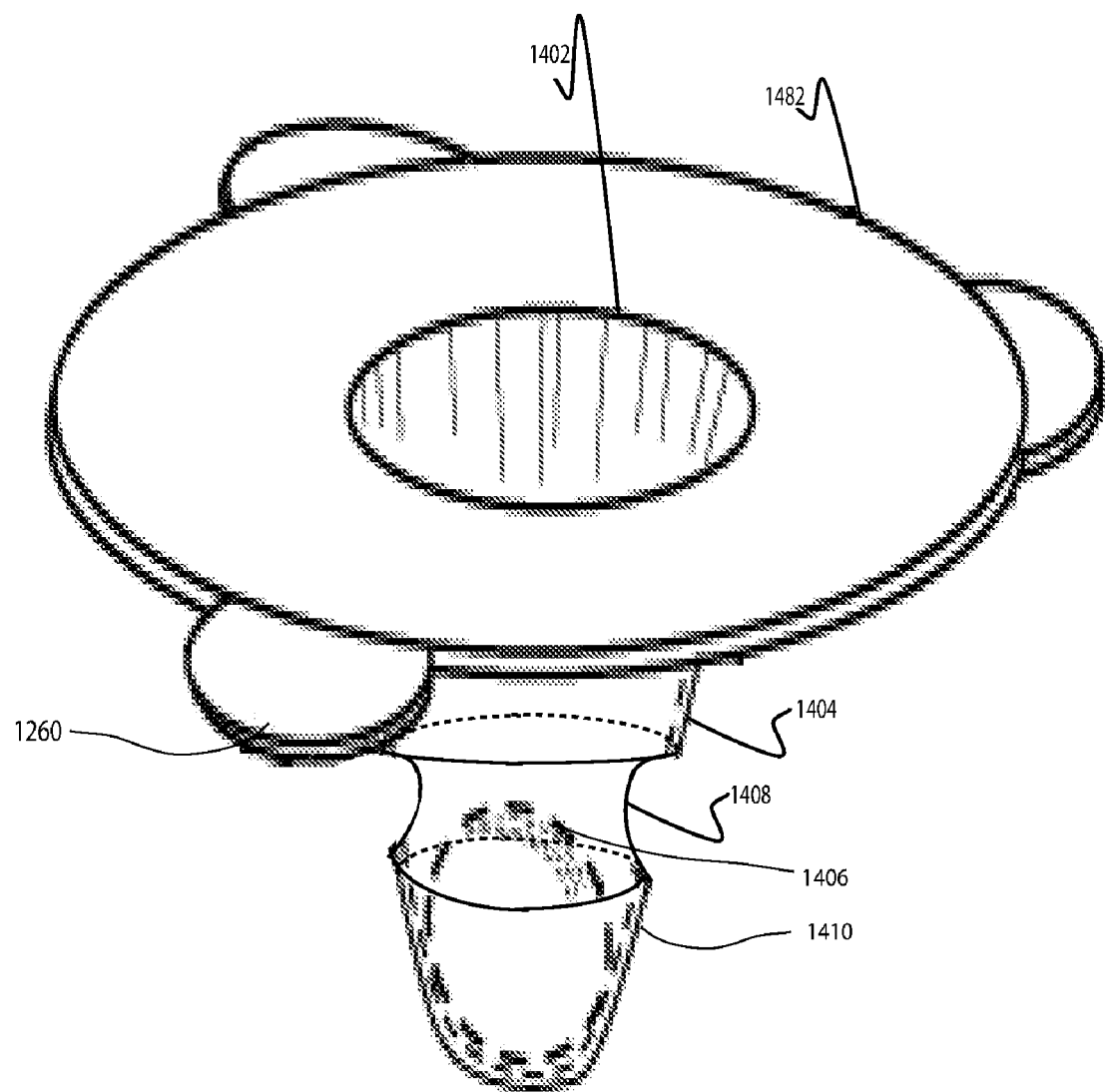
FIG. 14A is a perspective view of a sealing member in accordance with some embodiments of the present invention.
Figure 15:
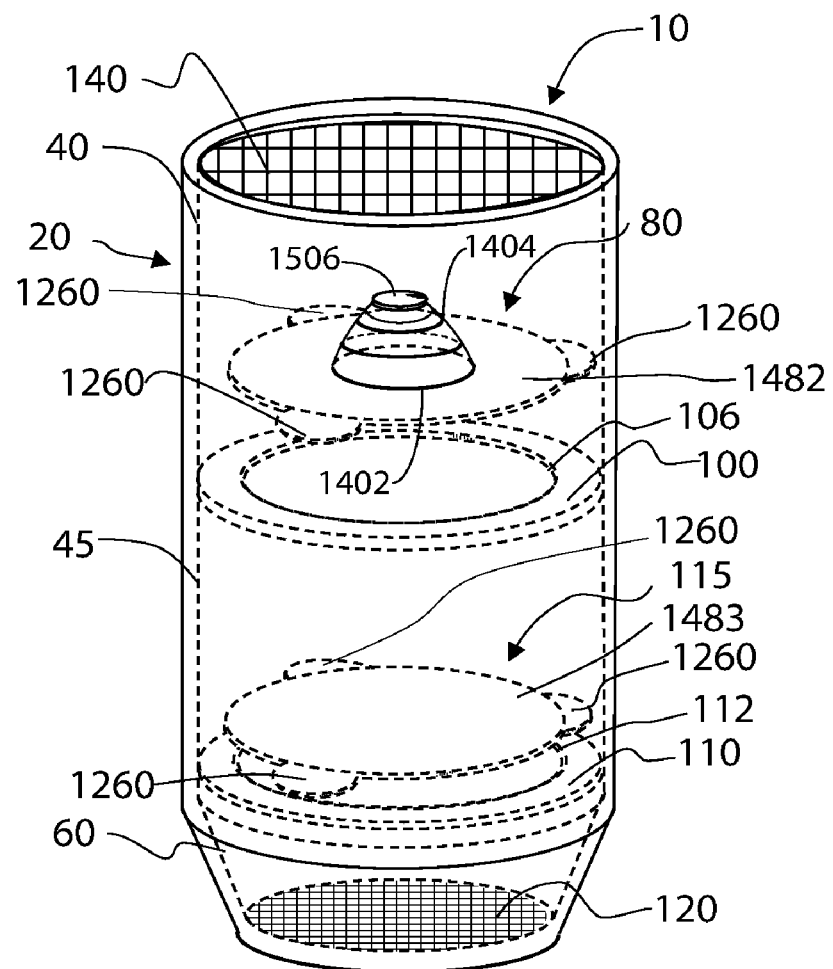
FIG. 15 is a perspective view of a valve assembly in accordance with some embodiments of the present invention.

In some embodiments, and as depicted in FIG. 14, the weight may be a ball 1406 disposed within the non-permeable sac 1404. The ball 1406 has a predetermined weight chosen open the corresponding valve when a predetermined pressure differential is achieved. In some embodiments, and as depicted in FIG. 14A, the non-permeable sac 1404 may include a reduced diameter section 1408 having a diameter less than a width of the ball 1406 and a pocket 1410 disposed beneath the reduced diameter section 1408 such that the ball 1406 is pushed beyond the reduced diameter section 1408 into the pocket 1410. In some embodiments, and as depicted in FIG. 15, the weight may alternatively be a disc 1506 that is attached to a lowermost portion of the non-permeable sac 1404.

Figure 16:
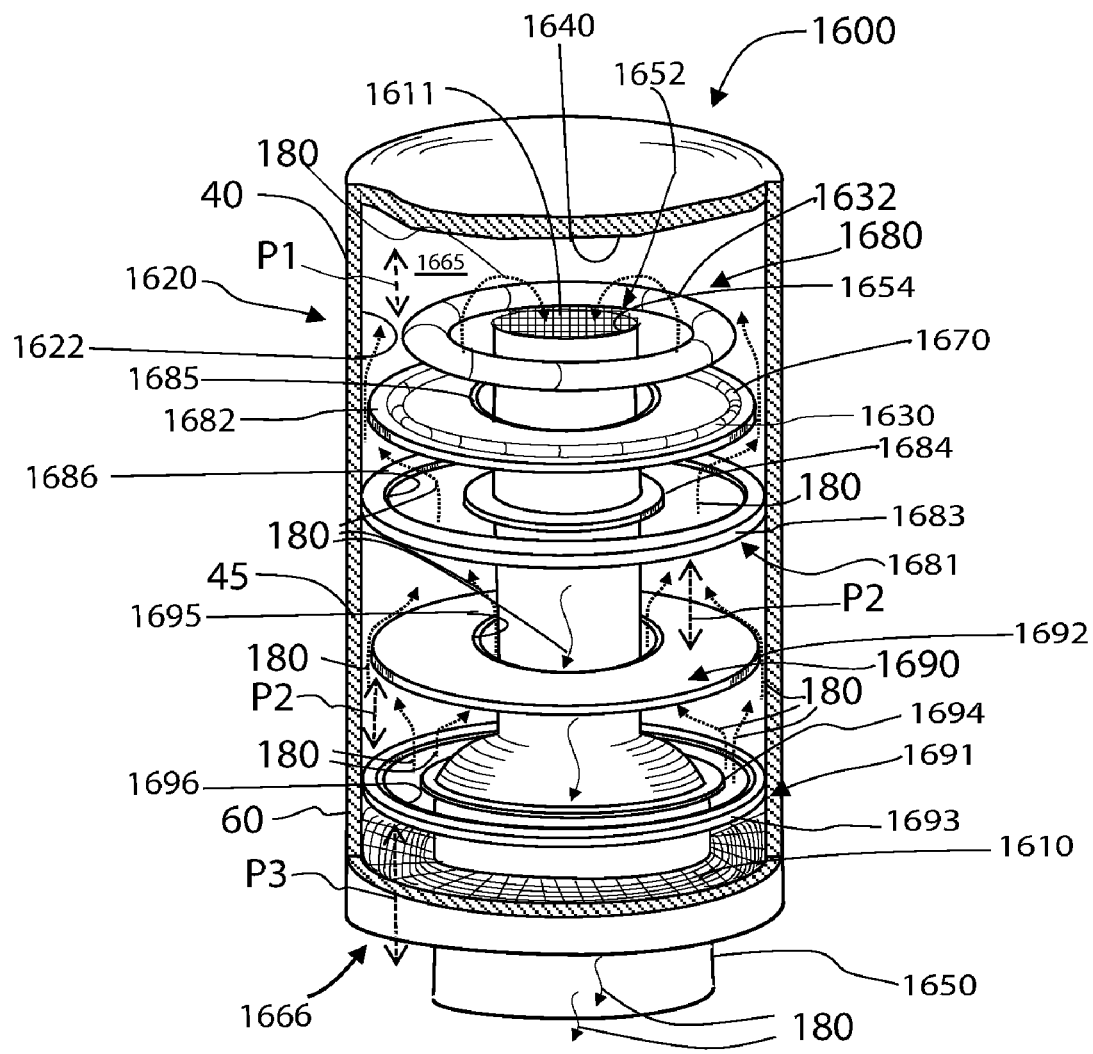
FIG. 16 is a cutaway view of a valve assembly in accordance with some embodiments of the present invention.

FIG. 16 depicts a valve assembly in accordance with some embodiments of the present invention. In some embodiments, and as depicted in FIG. 16, a valve assembly 1600 includes a housing 1620 having an interior volume 1665 and an inlet 1666 disposed at a first end 1699 of the housing 1620. The interior volume 1665 is fluidly coupled to an environment surrounding the valve assembly 1600 via the inlet 1666 and is defined by an interior wall 1622 and a ceiling 1640 disposed opposite the inlet 1666 of the housing 1620. The valve assembly 1600 further includes a pipe 1650 extending into the interior volume 1665 and having an end 1652 disposed below the ceiling 1640 of the housing 1620. The pipe 1650 is fluidly coupled to an enclosed environment (not shown in FIG. 16) and includes an inlet opening 1654 disposed in the end 1652.

The valve assembly 1600 includes a first valve 1680 and a second valve 1690. In some embodiments, the first valve 1680 includes a first valve seat 1681 and a first sealing member 1682 disposed above the first valve seat 1681. The first valve seat 1681 may include a first seat outer ring 1683 coupled to the interior wall 1622 and a first seat inner ring 1684 coupled to an exterior wall of the pipe 1650. The first sealing member 1682 includes a first central opening 1685, through which the pipe 1650 extends and is moveable between an open position, in which air is allowed to flow through a first space 1686 between the first seat outer and inner rings 1683, 1684, and a closed position, in which the first sealing member 1682 seals against the first valve seat 1681 to prevent air from flowing through the first space 1686.

In some embodiments, the second valve 1690 includes a second valve seat 1691 and a second sealing member 1692 disposed above the second valve seat 1691. The second valve seat 1691 may include a second seat outer ring 1693 coupled to the interior wall 1622 and a second seat inner ring 1694 coupled to an exterior wall of the pipe 1650. The second sealing member 1692 includes a second central opening 1695, through which the pipe 1650 extends and is moveable between an open position, in which air is allowed to flow through a second space 1696 between the second seat outer and inner rings 1693, 1694, and a closed position, in which the second sealing member 1692 seals against the second valve seat 1691 to prevent air from flowing through the second space 1696. In some embodiments, at least one of the first and second sealing members 1682, 1692 includes a plurality of turbulators 1980, as described with regards to FIG. 12A, coupled to a lower surface of the corresponding sealing member to spin sealing member when air flows past the plurality of turbulators 1980.

In some embodiments, the pipe 1650 is coaxial with the housing 1620, the first valve 1680, and the second valve 1690. An annular filter element 1610 may be disposed between the interior wall 1622 and the pipe 1650 below the second valve seat 1691 at or proximate to the inlet 1666 to prevent contaminants from passing through the annular filter element 1610 into the interior volume 1665. A second filter element 1611 may be disposed within the pipe 1650 at or proximate the inlet opening 1654 to prevent contaminants from passing through the second filter element 1611 into the pipe 1650 or from the pipe 1650 and into the interior volume 1665.

Figure 16A:
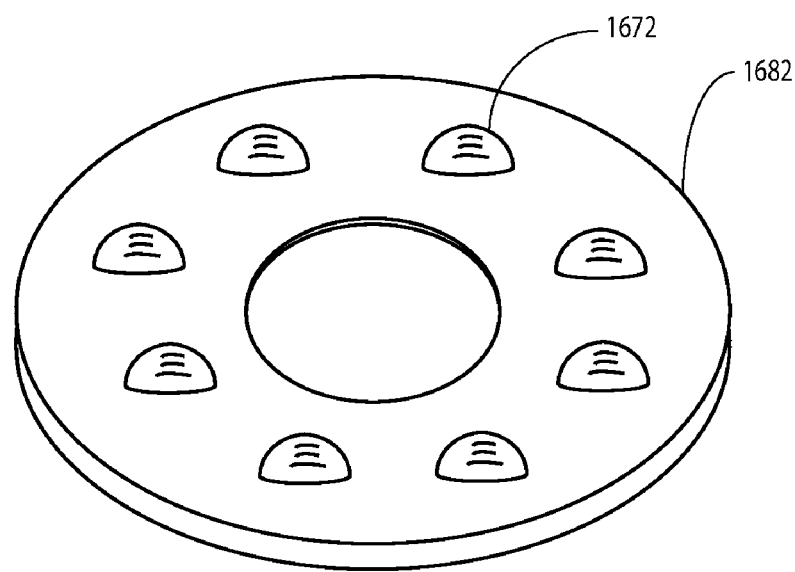
FIG. 16A is a perspective view of a sealing member for use with a valve assembly in accordance with some embodiments of the present invention.

In some embodiments, at least one of the first valve 1680 and the second valve 1690 (only the first valve 1680 in FIG. 16) may include a flexible membrane section 1630 disposed in the corresponding sealing member and a ring 1632 disposed atop the flexible membrane section 1630. The ring 1632 has a predetermined weight and is configured to bias the corresponding sealing member towards the closed position. When the pressure beneath the valve seat is greater than the pressure above the valve seat and the combined weight of the sealing member and the ring 1632, the sealing member is moved to the open position. In some embodiments, and as depicted in FIG. 16, the flexible membrane section 1630 may be an annular membrane 1670 having a circumference less than or equal to a circumference of the ring 1632. In some embodiments, and as depicted in FIG. 16A, the flexible membrane section 1630 may alternatively be a plurality of compliant support elements 1672 arranges along a circumference around the pipe 1650. The circumference of the plurality of compliant support elements 1672 is less than or equal to the circumference of the ring.

Figure 17:
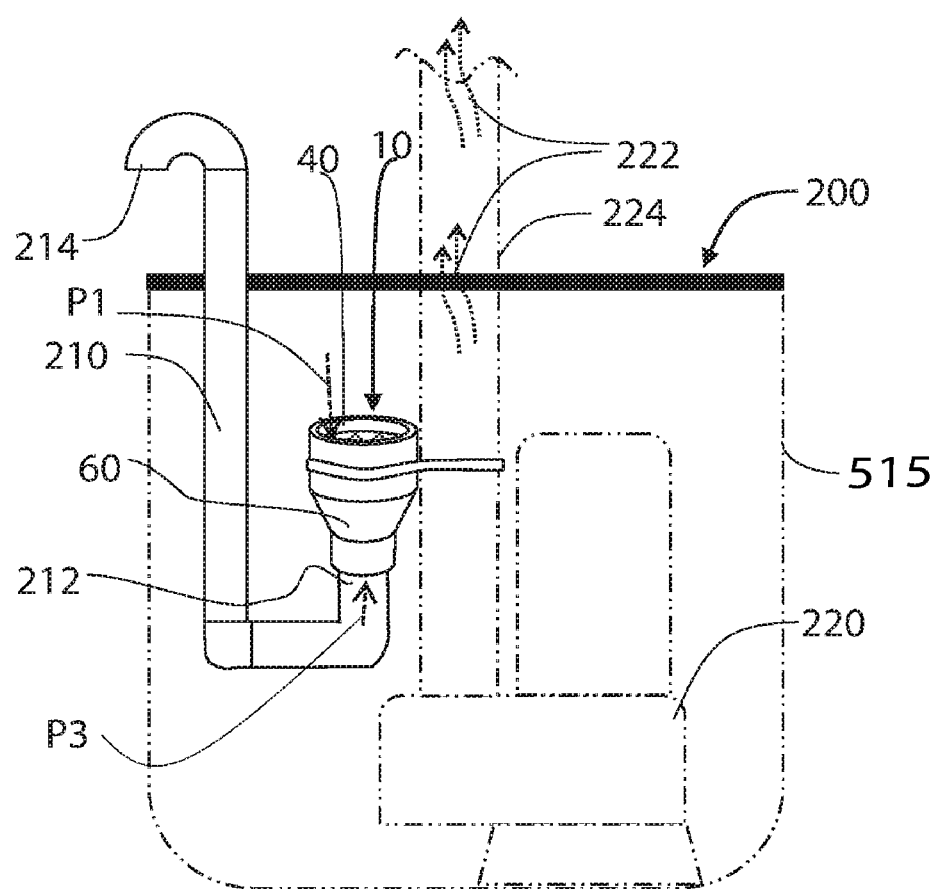
FIG. 17 is a schematic view of an enclosed environment incorporating a valve assembly in accordance with some embodiments of the present invention.

FIGS. 17-20 depict exemplary enclosed environments in which the inventive valve assembly 10 may be used. As depicted in FIG. 17, the valve assembly 10 is disposed in an enclosed environment 200 such as, for example, a pump pit. The pressure inside of the enclosed environment is the pressure P1 in the valve assembly 10 because the first zone 40 is open to the enclosed environment. In some embodiments, the enclosed environment 200 may include an enclosure 250, at least one conduit 210 extending into the enclosure 250, a pump 220 disposed within the enclosure, and a pipe 224 coupled to an outlet of the pump 220 and extending out of the enclosure 250. The at least one conduit 210 includes a first end 212 coupled to the inlet 66 of the valve assembly 10 and a second end 214 disposed outside of the enclosure 250 in an ambient environment. The pump 220 is configured to pump a medium 222 (e.g., sewage or water) out of the enclosure 250. If, during operation, the pump 220 creates a vacuum in the interior volume of the enclosure 250 (thus making P1 less than P2 and P3), the valve assembly 10 functions as explained above to allow ambient air to flow from the ambient environment, through the second end 214 of the at least one conduit 210, through the valve assembly 10, and into the enclosure 250 to alleviate the vacuum condition created by the pump 220. In some embodiments, the valve assembly 10 is configured to provide at least about 12 cubic inches per second for each millimeter of diameter of the pipe 224 when the valve assembly 10 is disposed in an enclosed environment in which a pump operates. Such an embodiment assumes that the pump 220 is a ⅓ horsepower pump.

Figure 18:
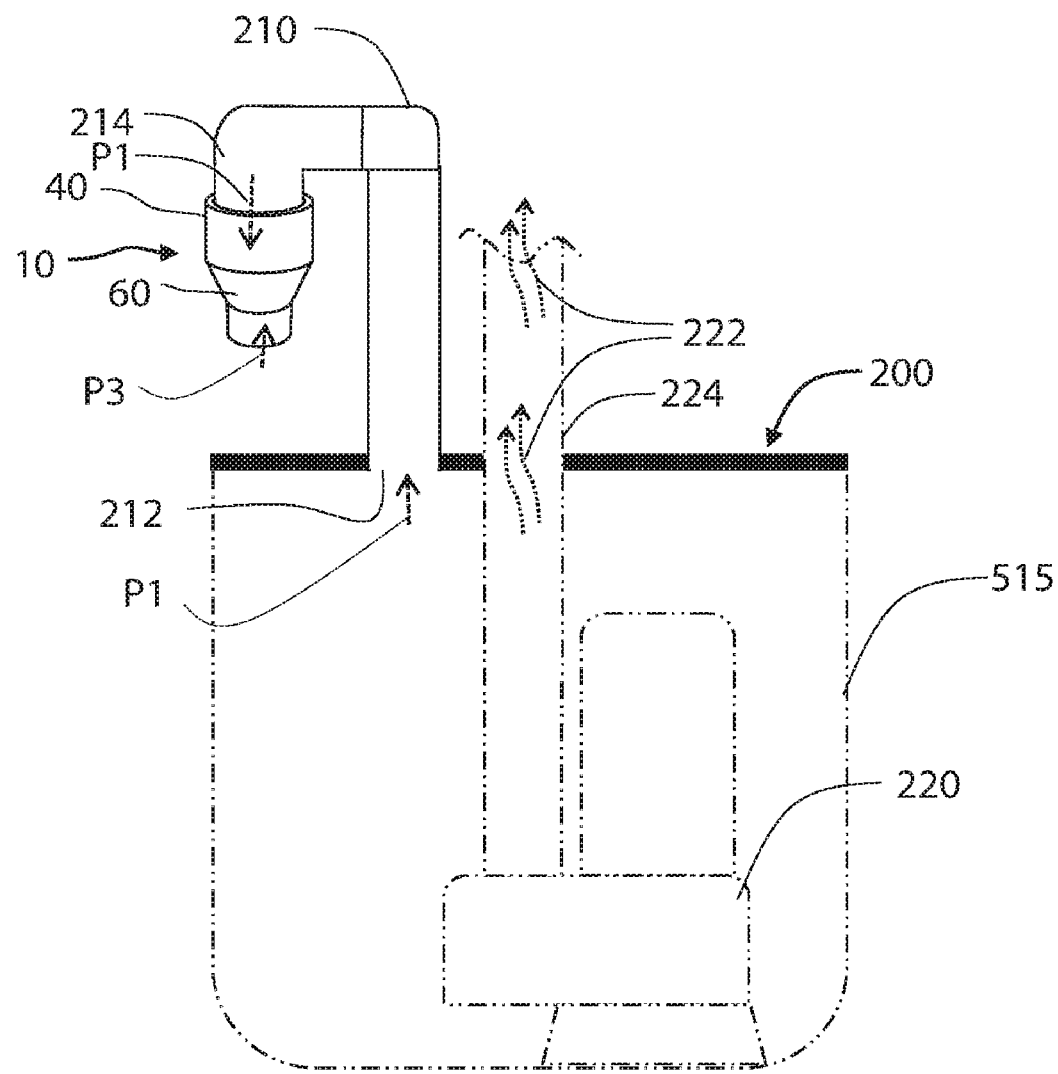
FIG. 18 is a schematic view of an enclosed environment incorporating a valve assembly in accordance with some embodiments of the present invention.

Referring to FIG. 18, in some embodiments, the valve assembly 10 may be disposed outside of the enclosed environment 200. For example, the first end 212 of the at least one conduit 210 may be coupled to the enclosure 250 and the second end 214 coupled to the outlet 67 of the valve assembly 10. As such, the flow path of ambient air into the enclosure 250 is through the inlet 66, the outlet 67, and the at least one conduit 210 and into the enclosure 250.

Figure 19:
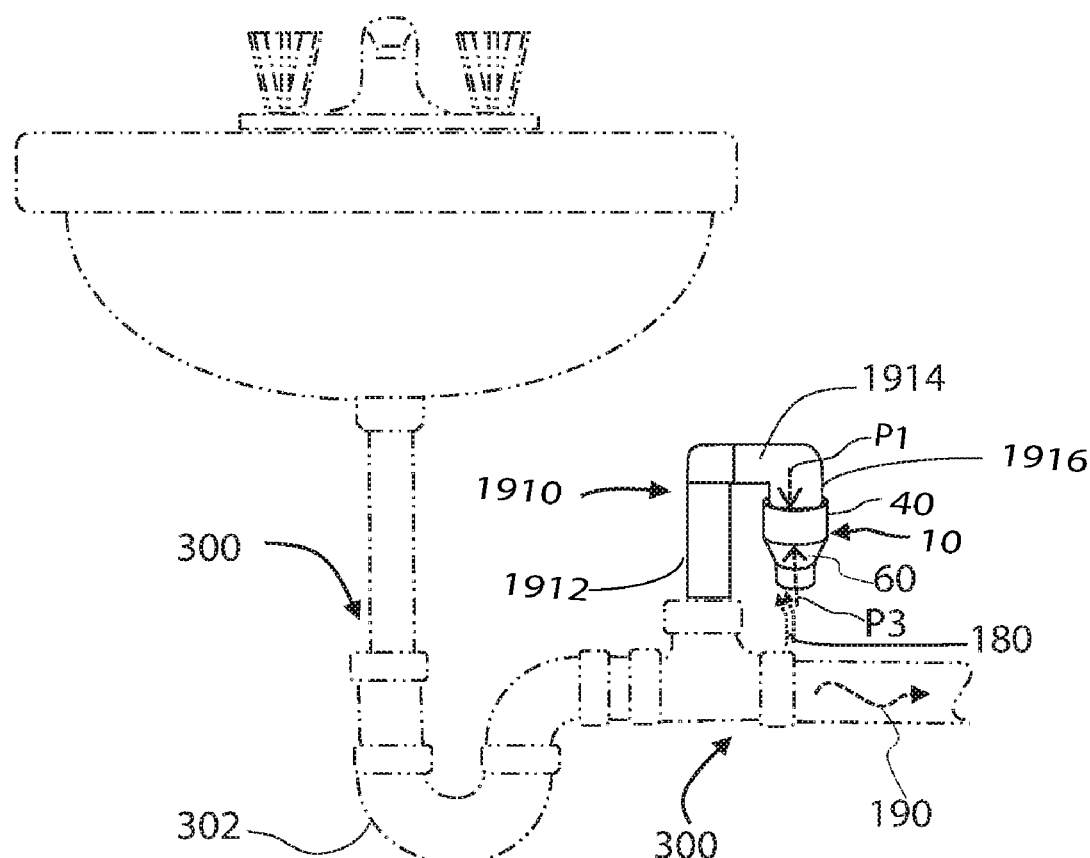
FIG. 19 is a schematic view of a plumbing system incorporating a valve assembly in accordance with some embodiments of the present invention.

FIG. 19 depicts another embodiment of an enclosed environment in which the valve assembly 10 may be used. As illustrated in FIG. 19, the valve assembly 10 may be coupled to a piping system 300 coupled to, for example, a sink drain. As explained above, such a piping system may include a main pipeline 304 and a trap 302 coupled to the main pipeline 304 and that provides a water seal preventing sewage gases from escaping from the main pipeline 304 into a building in which the sink is disposed. To prevent a negative pressure downstream of the trap 302 from breaking the water seal, the valve assembly 10 is coupled to a conduit 1910, which is coupled to the main pipeline 304 via a t-connection. In some embodiments, the conduit 1910 may include a first vertical portion 1912, a u-shaped portion 1914, and a second vertical portion 1916 disposed parallel to the first vertical portion 1912. The first vertical portion 1912 is coupled to the main pipeline 304 at a first end and to the u-shaped portion 1914 at a second end opposite the first end. The second vertical portion 1916 is coupled to an end of the u-shaped portion 1914 opposite the first vertical portion 1912. The valve assembly 10 is coupled to the second vertical portion 1916 at an end opposite the u-shaped portion 1914. In such an embodiment, the pressure inside of the main pipeline 304 is the first pressure P1 and the ambient pressure in the surrounding environment is the third pressure P3. The air admittance requirement for the flow 180 into the piping system 300 is generally about 1 cubic feet per minute or about 0.47 litter per second, but these values may vary based on the scale/size of the piping system 300.

Figure 20:
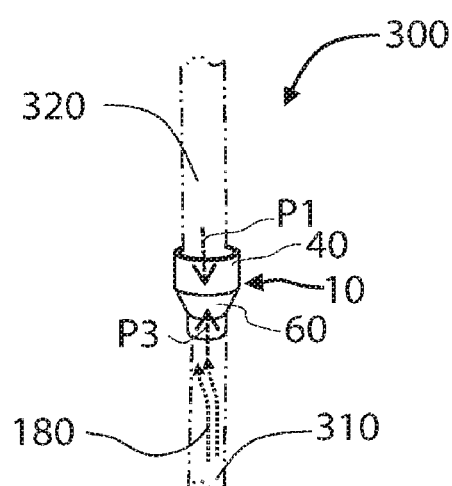
FIG. 20 is a schematic view of a plumbing system incorporating a valve assembly in accordance with some embodiments of the present invention.

FIG. 20 depicts an embodiment of an enclosed environment in which the valve assembly 10 may be incorporated. As illustrated in FIG. 20, the valve assembly 10 is coupled in-line with the piping system 300. That is, a first section 310 of the piping system 300 is coupled to the inlet 66 and a second section 320 of the piping system 300 is coupled to the outlet 67 such that the first zone 40 is fluidly coupled to the second section 320 and the third zone 60 is fluidly coupled to the first section 310. In this configuration, flow 180 is allowed to move from the first section 310 to the second section 320, but not from the second section 320 to the first section 310, thus advantageously avoiding backflow.

Figure 21:
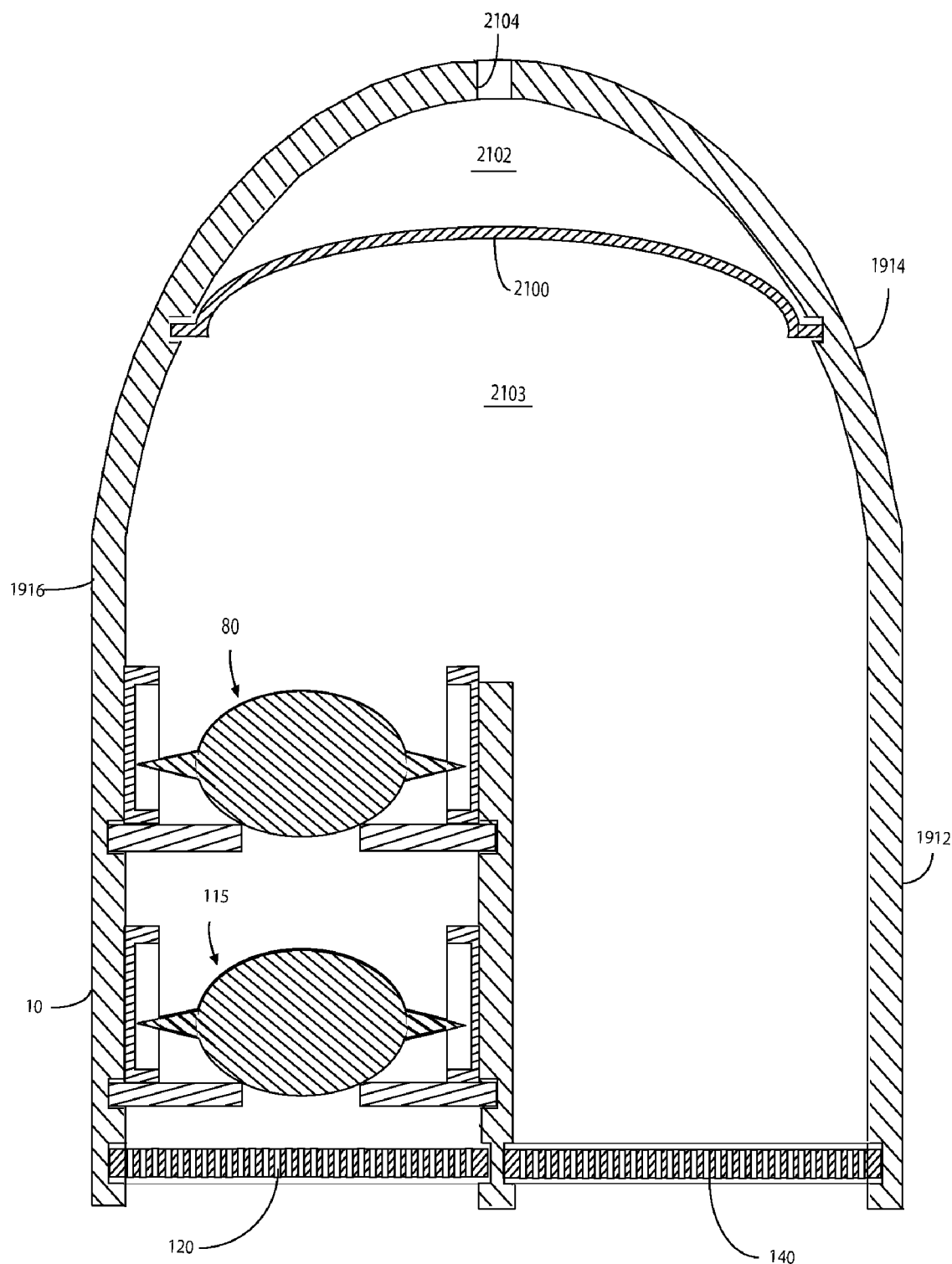
FIG. 21 is a cross-sectional view of a conduit coupled to an enclosed environment and a valve assembly in accordance with some embodiments of the present invention.

FIG. 21 depicts a cross-sectional view of the conduit 1910 and the valve assembly in accordance with some embodiments of the present invention. In some embodiments, the conduit 1910 may include a flexible membrane 2100 disposed in within an upper section of the u-shaped portion 1914 perpendicular to a plane of the first vertical portion 1912. The flexible membrane 2100 may be coupled to an interior wall 2122 of the u-shaped portion 1914 so that an upper volume 2102 above the flexible membrane 2100 is fluidly isolated from a lower volume 2103 below the flexible membrane 2100. The flexible membrane 2100 advantageously provides a countermeasure against backpressure resulting from increased pressure in the main pipeline 304 (not shown in FIG. 21). When such a backpressure exists, the first and/or second valves 80, 115 may be forced even further into a closed position, thus possibly damaging the valves or resulting in one or both of the valves being stuck in a closed position. The flexible membrane 2100 alleviates the increase in pressure by expanding upwards to temporarily increase the volume of the lower volume 2103, thus alleviating some or all of the backpressure and avoiding damage to the valves. In some embodiments, a hole 2104 may be formed in the top of the u-shaped portion 1914 so that air within the upper volume 2102 has an escape when the flexible membrane 2100 expands upwards. In some embodiments, there is no hole above the flexible membrane 2100. Instead, the upper volume 2102 may contain an ideal gas, which is lighter than air and occupies less space/volume, thus allowing for the expansion of the flexible membrane 2100 in a sealed environment.

Figure 22:
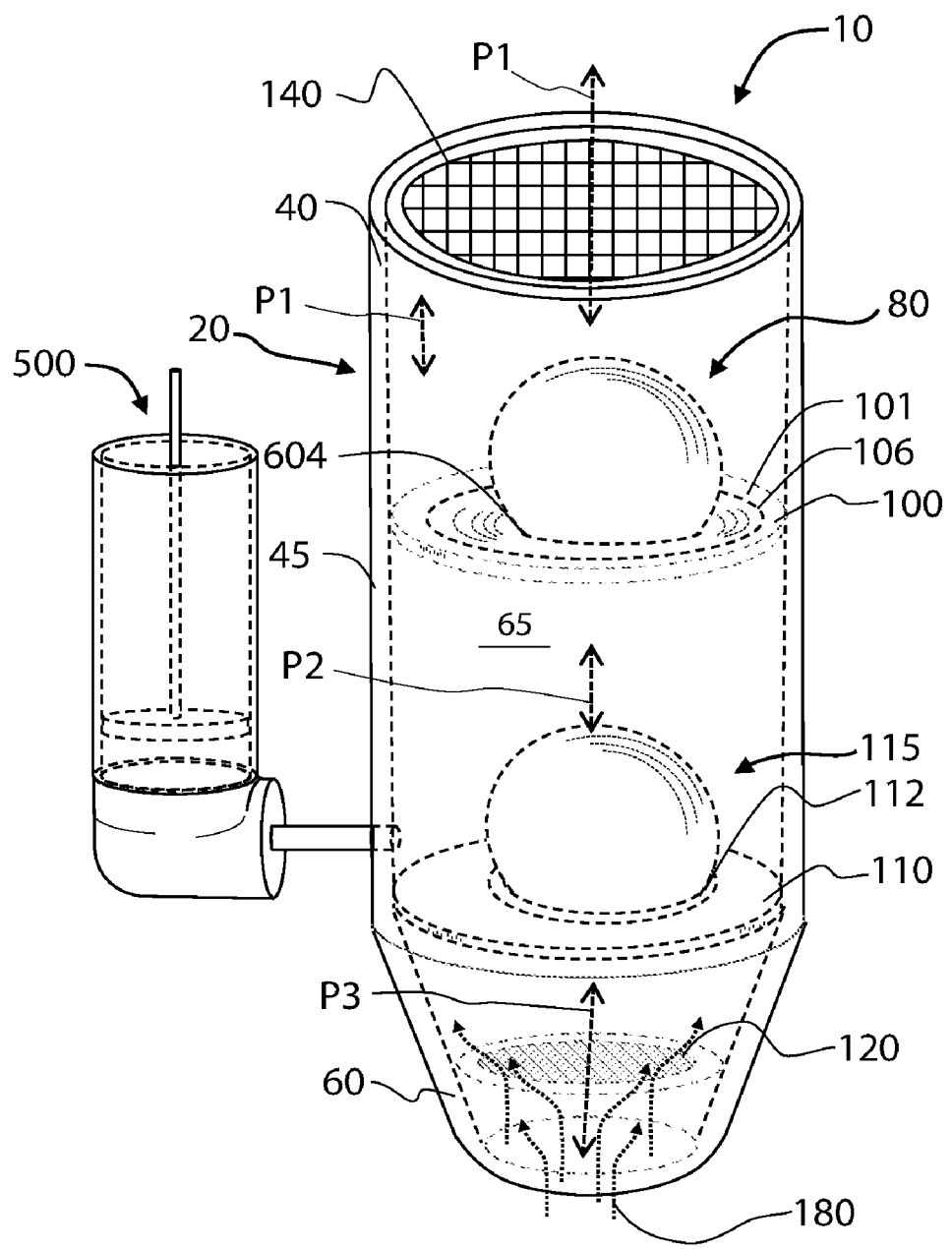
FIG. 22 is a cutaway view of a valve assembly having a pressure indicator in accordance with some embodiments of the present invention.
Figures 23A, 23B:
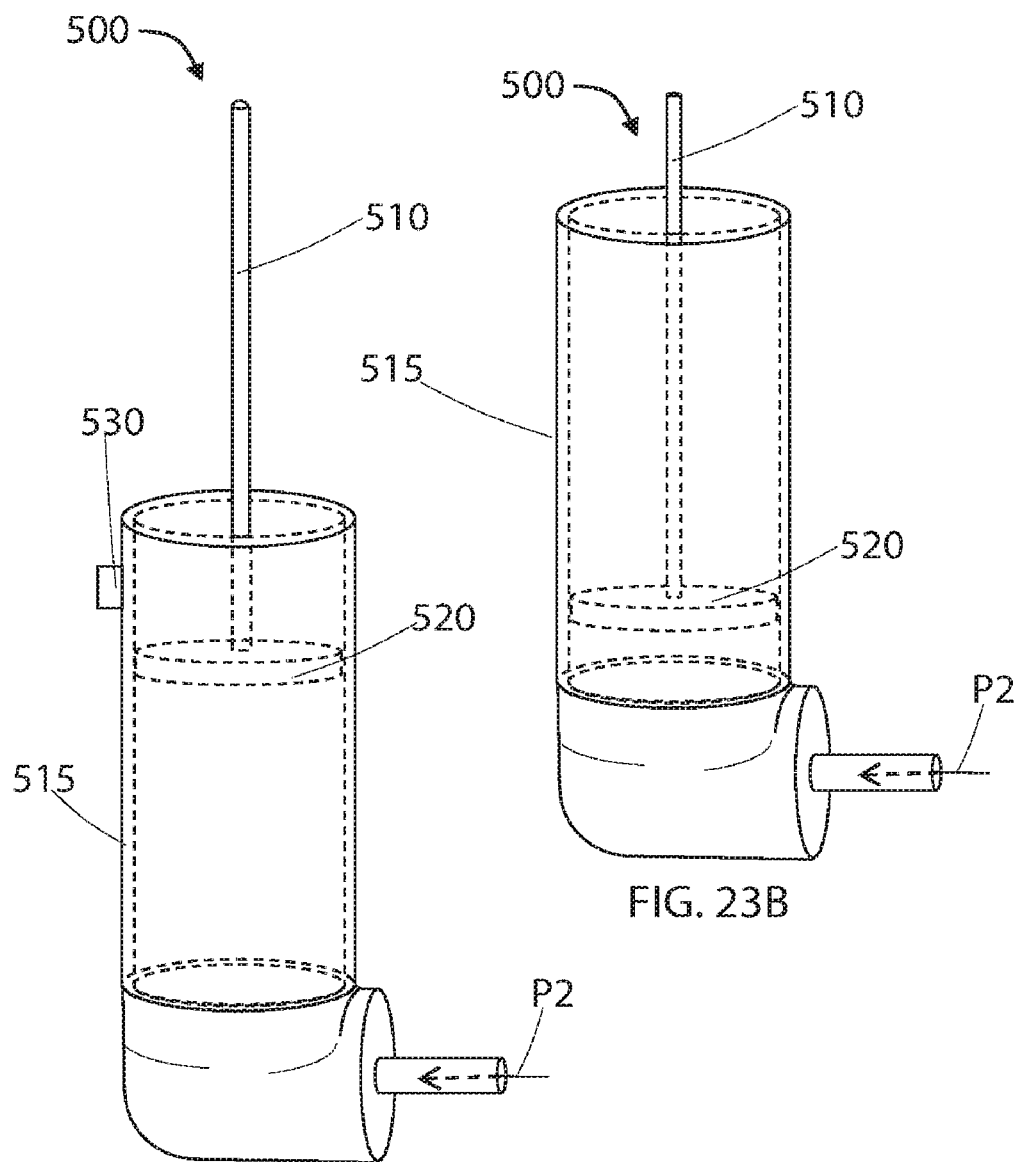
FIGS. 23A and 23B are perspective views of a pressure indicator in accordance with some embodiments of the present invention.

FIGS. 22-23A depict schematic views of a pressure-monitoring device 500 for use with a valve assembly in accordance with some embodiments of the present invention. In some embodiments, the pressure-monitoring device 500 may be coupled to the housing 20 to monitor the second pressure P2 in the second zone 45 to allow for inspection of the valve assembly 10 and determination of whether or not a leak in one of the first and second valves 80, 115 exists. In some embodiments, the pressure-monitoring device 500 may include a piston 520 disposed within a housing 515. An indicator rod 510 may be coupled to the piston 520 on a side opposite the inner volume of the housing 515 to provide an indication of the second pressure P2 within the second zone 45. In some embodiments, the pressure-monitoring device 500 may also include a signal transmitter 530 which is configured to detect the position of the piston 520 and transmit a pressure reading based on the detected position to a remote device (e.g., a computer, a cellular phone, etc.). As the second pressure P2 in the second zone 45 increases, the position of the piston 520 is raised. Although a specific pressure-monitoring device 500 has been described, it should be noted that any pressure-monitoring device capable of measuring pressure within the valve assembly 10.

What claimed is:

1. A valve assembly for use with an enclosed environment, comprising:
   (a) a housing having an interior volume, an inlet disposed at a first end of the housing and fluidly coupled to an environment surrounding the housing, and an outlet disposed at a second end of the housing, wherein said interior volume is divided into a first zone, a second zone, a third zone, wherein said first zone occupies a predetermined volume of said interior volume proximate said outlet, wherein said third zone occupies a predetermined volume of said interior volume proximate said inlet, wherein said second zone occupies a predetermined volume of said interior volume between said first zone and said third zone, wherein a first zone pressure exists in said first zone, wherein a second zone pressure exists in said second zone, and wherein a third zone pressure exists in said third zone;

(b) a first valve inside said housing, comprising a first valve seat, wherein said first valve seat is disposed between said first zone and said second zone wherein said first valve seat has a first opening, wherein said first valve further comprises a first sealing member, wherein said first sealing member has a dimension greater than said first opening, wherein said first sealing member dimension is less than the inner diameter of said housing, wherein said first sealing member has a predetermined weight, and wherein said first sealing member moves inside said first zone and away from said first valve seat, wherein said first valve is in an open position when said second zone pressure is greater than said sealing member predetermined weight and said first zone pressure, and wherein said first valve is in a closed position when said second zone pressure is less than said sealing member predetermined weight and said first zone pressure;

(c) a second valve inside said housing, comprising a second valve seat, wherein said second valve seat is disposed between said second zone and said third zone wherein said second valve seat has a second opening, wherein said second valve further comprises a second sealing member, wherein said second sealing member has a dimension greater than said second opening, wherein said second sealing member dimension is less than the inner diameter of said housing, wherein said second sealing member has a predetermined weight, and wherein said second sealing member moves inside said second zone and away from said second valve seat, wherein said second valve is in an open position when said third zone pressure is greater than said sealing member predetermined weight and said second zone pressure, and wherein said second valve is in a closed position when said third zone pressure is less than said sealing member predetermined weight and greater than said second zone pressure;

wherein the first sealing member comprises a first upper hemispherical section, a first lower hemispherical section, a first neck section connecting the first upper and lower hemispherical sections, the first neck section having a first diameter less than a first opening diameter of the first opening of the first valve seat, a portion of each of the first upper and lower hemispherical sections being sized larger than the first opening diameter forms a seal when abutting against the first valve seat, and the second sealing member comprises a second upper hemispherical section, a second lower hemispherical section, a second neck section connecting the second upper and lower hemispherical sections, the second neck section having a second diameter less than a second opening diameter of the second opening of the second valve seat, a portion of each of the second upper and lower hemispherical sections being sized larger than the second opening diameter forms a seal when abutting against the second valve seat.

2. The valve assembly of claim 1, further comprising a pressure indicator, wherein said pressure indicator is responsive to said middle flow passage pressure, wherein said pressure indicator is visible on an external surface of said housing, and wherein said pressure indicator shows a pressure status of said middle flow passage pressure.

3. The valve assembly of claim 2, further comprising a signal transmitter transmits said pressure status of said pressure indicator.

* * * * *